United States Patent [19]

Faltings

[11] Patent Number: 5,784,540
[45] Date of Patent: Jul. 21, 1998

[54] SYSTEMS FOR SOLVING SPATIAL REASONING PROBLEMS VIA TOPOLOGICAL INFERENCE

[75] Inventor: Boi Faltings, Lausanne, Switzerland

[73] Assignee: Ecole Polytechnique Federal de Lausanne, Lausanne, Switzerland

[21] Appl. No.: 614,831

[22] Filed: Mar. 8, 1996

[51] Int. Cl.$^6$ .................................................. G06F 15/18
[52] U.S. Cl. .............................................. 395/51; 364/461
[58] Field of Search ........................... 364/461; 395/51, 395/10

[56] References Cited

U.S. PATENT DOCUMENTS 5,519,618  5/1996  Kastner et al. ......................... 364/461

OTHER PUBLICATIONS

Boi Faltings; "Qualitative Spatial Reasoning using Algebraic Topology," in A. Frank, W. Kuhn(eds): Spatial Information Theory, Lecture Notes in Computer Science, Springer-Verlag, pp. 17–30, Sep. 1995.

D.J. Rose, R.E. Tarjan, G.S. Leuker; "Algorithmic Aspects of Vertex Elimination on Graphs," SIAM J. Comput. Jun. 1976.

T. Lozano–Perez, M. Wesley; "An Algorithm for Planning Collision–Free Paths Among Polyhedral Obstacles," Comm. of the ACM, 1979.

E. Stefanakis and M. Kavouras, "On the Determination of the Optimum Path in Space," Proc. Spatial Information Theory: A Theoretical Basis for GIS, Int'l Conf. COSIT '95, pp. 241–257, Sep. 1995.

*Primary Examiner*—Robert W. Downs
*Attorney, Agent, or Firm*—Page Lohr Associates

[57] ABSTRACT

New methods of manipulating topological regions and properties have been discovered. These novel methods simplify complex spatial design problems. In some cases, the methods provide solutions or outputs where prior techniques fail entirely. Prior methods of reasoning about relations in two-dimensional space require computation with exact geometry even when only topological answers are required. For example, computing which sets of two-dimensional regions have simultaneous intersections would require explicitly constructing these intersections. These techniques become unnecessarily complex when regions have complex shapes. The present invention includes methods where topological properties of a set of regions in two-dimensional space can be manipulated by applications of topological computations. Two classes of these methods select and determine maximal and minimal simultaneous region intersections. A third method class produces sets of geometrical minimal paths satisfying a particular rule base through predetermined topological regions. The newly devised methods are much simpler and more robust than geometric methods as they do not require the exact shapes of regions to be completely known. In addition, the newly devised methods do not incur a penalty for complex curved shapes such as may occur in nature.

36 Claims, 20 Drawing Sheets

```
Function order(P,T)
    for all p ∈ P do label(p) ← { }
    j ← |P|
    repeat
        p ← pair ∈ P with the
                   lexicographically highest label
        σ(j) ← p
        P ← P - p
        for all x in P do
            begin
                if three-adj(x,p,T) then
                    label(x) ← label(x) ∪ {j}
            end
        j ← j - 1
    until P is empty
    return σ
end
```

```
Function eliminate(P,T,σ)
    C ← { }
    For j ← 1 to σ do
        begin
            p ← σ(j)
            c ← {r | (∃ x ∈ P) three-adj(x,p,T) ∧ (r ∈ x)}
            if there does not exist d ∈ C such that d ⊇ c
                C ← C + c
            T ← T - {t|t ⊃ p }
        end
    return C
```

```
Function order(P,T)
for all p ∈ P do label(p) ← {}
j ← |P|
repeat
     p ← pair ∈ P with the
               lexicographically highest label
     σ(j) ← p
     P ← P - p
     for all x in P do
          begin
          if three-adj(x,p,T) then
               label(x) ← label(x) ∪ {j}
          end
     j ← j - 1
until P is empty
return σ
end
```

Figure 1

```
Function three-adj(x,y,T)
bits ← x ∪ y
when every subset {X₁X₂X₃ ⊂ bits} ∈ T then
    return true else return false
end Function lex-greater(l1 l2)

while (first(l1) = first(l2)) and
        (l1 ≠ {}) and (l2 ≠ {}) do
    begin
    l1 ← rest(l1)
    l2 ← rest(l2)
    end
if l1 ≠ {} then
    if l2 ≠ {} then
        if (first(l1) > first(l2)) then return(true)
                    else return(false)
    else
        return(true)
else
    return(false)
```

Figure 2

```
Function eliminate(P,T,σ)
C ← { }
For j ← 1 to σ do
      begin
      p ← σ(j)
      c ← {r | (∃ x ∈ P) three-adj(x,p,T) ∧ (r ∈ x)}
      if there does not exist d ∈ C such that d ⊇ c
            C ← C + c
      T ← T - {t|t ⊃ p }
      end
return C
```

Figure 3

```
function min-candidates(M)
cands ← {}
M1 ← M
while M1 ≠ {} do
    begin
    M2 ← rest(M1)
    while M2 ≠ {} do
        begin
        M3 ← rest(M2)
        while M3 ≠ {} do
            begin
            c ← first(M1) ∩ first(M2) ∩ first(M3)
            if not member(c,cands) then
                cands ← cands ∪ c
            end
        end
    end
return cands
```

Figure 4

```
function components(X,Y,M)

parts ← {}
firstpart ← {}
while Y ≠ {} do
      begin
      repeat
           new ← {}
           for all y ∈ Y do
                 begin
                 if ∃ p ∈ firstpart such that
                        intersects?(X ∪ {y,p},M) then
                        begin
                        new ← new ∪ y
                        Y ← Y - y
                        end
                 end
           firstpart ← firstpart ∪ new
      until new = {}
      parts ← parts ∪ firstpart
      firstpart ← {}
      end
return length(parts)
```

Figure 5

```
Function order2(P,T)
j ← |P|
for all p ∈ P do
      begin
            p-label(p) ← {}
            s-label(p) ← {}
      end repeat
      p ← pair in P with the lexicographically
            highest p-label, where ties are broken in
            favor of the highest s-label.
      P ← P - p
      σ(j) ← p
      for all x in P do
            begin
            if three-adj(x,p,T) then
                  begin
                  p-label(x) ← p-label(x) ∪ {j}
                  U ← all regions involved in x or p
                  N ← {}
                  for all pairs u,v ∈ U do
                        begin
                        if σ^(-1)((u,v)) ≥ j then N ← N ∪ σ^(1)((u,v))
                        end
                  if |N| + 2 = |U| · (|U|-1)/2 then
                        begin
                        for all n σ N do
                              begin
                              s-label(x) ← s-label(x) ∪ n
                              end
                        end
                  end
            end
      j ← j - 1
until P is empty
return σ
end
```

Figure 7

```
function iterative-euler(X,Y,M,σ)
x ← an arbitrary region in X
sort y ∈ Y according to $σ^{(-1)}$ of edges y-x
sum ← 1
while Y ≠ {} do
        begin
        f ← first(Y)
        Y ← rest(Y)
        sum ← sum + components(X ∪ {f},Y,M) - 1
        end
return sum
```

Figure 8

```
function min-candidates2(M)
cands ← {}
M1 ← M
while M1 ≠ {} do
      begin
      M2 ← rest(M1)
      while M2 ≠ {} do
            begin
            c2 ← first(M1) ∩ first(M2)
            if not member(c2,cands) then
                  cands ← cands ∪ c2
            M3 ← rest(M2)
            while M3 ≠ {} do
                  begin
                  c3 ← c2 ∩ first(M3)
                  if not member(c3,cands) then
                        cands ← cands ∪ c3
                  end
            end
      end
return cands
```

Figure 10

```
function path-places(C,M,σ)
places ← {}
for all c ∈ C do
      begin
      σ ← overlap(c,M)
      comp ← components(c,o,M)
      euler ← euler(c,o,M,σ)
      f (comp ≠ 1) or (euler + comp - 1 ≠ 0) then
            places ← places ∪ c
      end
return places
```

Figure 11

Table 1. Execution trace of a function order on the example.

| Order | Edge | 3-adjacent edges |
|---|---|---|
| 16 | a-b | a-x,b-x,a-y,b-y,x-y |
| 15 | a-x | a-b,a-c,a-y,b-x,b-y,c-x,c-y,x-y |
| 14 | b-x | a-b,b-c,b-e,a-x,a-y,b-y,c-x,x-y,e-x,c-y,c-e |
| 13 | a-y | a-b,a-c,a-x,b-y,c-y,x-y,b-x,c-x |
| 12 | b-y | a-b,b-c,b-x,a-y,c-y,x-y,a-x,c-x |
| 11 | x-y | a-b,a-c,b-c,a-x,b-x,c-x,a-y,b-y,c-y |
| 10 | c-x | a-c,b-c,c-d,c-e,a-x,b-x,d-x,e-x,a-y,b-y,c-y,x-y,b-e |
| 9 | c-y | a-c,b-c,c-x,a-y,b-y,x-y,a-x,b-x |
| 8 | a-c | a-x,a-y,c-x,c-y,x-y |
| 7 | b-c | b-x,c-x,b-y,c-y,x-y |
| 6 | e-x | b-c,b-e,b-x,c-e,c-x,d-e,d-x |
| 5 | c-e | b-c,b-e,b-x,c-x,e-x |
| 4 | b-e | b-c,b-x,c-e,c-x,e-x |
| 3 | d-x | c-d,c-x,d-e,e-x |
| 2 | c-d | c-x,d-x |
| 1 | d-e | d-x,e-x |

Figure 17

Table 2. Execution trace of function eliminate on the example, using the ordering produced by function order.

| Order | Edge | 3-adjacent edges | 3-clique | eliminated triples |
|---|---|---|---|---|
| 1 | d-e | d-x,e-x | {d,e,x} * | d-e-x |
| 2 | c-d | c-x,d-x | {c,d,x} * | c-d-x |
| 3 | d-x | {c-d},{e-x},{d-e},{e-x} | {d,x} | - |
| 4 | b-e | b-c,b-x,c-e,c-x,e-x | {b,c,e,x} * | b-e-x,b-c-e |
| 5 | c-e | {b-c},{b-e},{b-x},c-x,e-x | {c,e,x} | c-e-x |
| 6 | e-x | {b-c}, {b-e},{b-x},{c-e},{e-x},{d-e},{d-x} | {e,x} | - |
| 7 | b-c | b-x,c-x,b-y,c-y,x-y | {b,c,x,y} * | b-c-x, b-c-y |
| 8 | a-c | a-x,a-y,c-x,c-y,x-y | {a,c,x,y} * | a-c-x, a-c-y |
| 9 | c-y | {a-c},{b-c},c-x,{a-y},{b-y},x-y,{a-x},{b-x} | {c,x,y} | c-x-y |
| 10 | c-x | {a-c},{b-c},{c-d},{c-e},{a-x},{b-x},{d-x}, {e-x},{a-y}, {b-y},{c-y},{x-y},{b-e} | {c,x} | - |
| 11 | x-y | a-b,{a-c},{b-c},a-x,b-x,{c-x},a-y,b-y,{c-y} | {a,b,x,y} * | a-x-y, b-x-y |
| 12 | b-y | a-b,{b-c},{b-x},a-y,{c-y},{x-y},{a-x},{c-x} | {a,b,y} | a-b-y |
| 13 | a-y | {a-b},{a-c},{a-x},{b-y},{c-y},{x-y},{b-x},{c-x} | {a,y} | - |
| 14 | b-x | a-b,{b-c},{b-e},a-x,{a-y},{b-y},{c-x},{x-y},{e-x},{c-y},{c-e} | {a,b,x} | a-b-x |
| 15 | a-x | {a-b},{a-c},{a-y},\xout{b-x},{b-y},{c-x},{c-y},{x-y} | {a,x} | - |
| 16 | a-b | {a-x}, {b-x},{a-y},{b-y},{x-y} | {a,b} | - |

Figure 18

Table 3. Candidates for minimal intersections and their characteristics. Actual minimal intersections are x and xy.

| Candidate | Components | Euler | $\|H_1\|$ |
|---|---|---|---|
| {a} | 1 | 1 | 1 |
| {a,b} | 2 | -1 | 0 |
| {a,f1} | 2 | -1 | 0 |
| {a,f2} | 2 | -1 | 0 |
| {a,x} | 2 | -1 | 0 |
| {a,x,y} | 2 | -1 | 0 |
| {b} | 1 | 2 | 2 |
| {b,c,x} | 3 | -2 | 0 |
| {b,e} | 2 | -1 | 0 |
| {b,f1} | 2 | -1 | 0 |
| {b,f3} | 2 | -1 | 0 |
| {b,f4} | 3 | -2 | 0 |
| {b,x} | 1 | 0 | 0 |
| {b,x,y} | 2 | -1 | 0 |
| {c,x} | 3 | -2 | 0 |
| {c,x,y} | 2 | -1 | 0 |
| {d} | 1 | 1 | 1 |
| {d,e} | 2 | -1 | 0 |
| {d,f2} | 2 | -1 | 0 |
| {d,f3} | 2 | -1 | 0 |
| {d,x} | 3 | -2 | 0 |
| {e} | 1 | 1 | 1 |
| {e,f3} | 2 | -1 | 0 |
| {e,x} | 2 | -1 | 0 |
| {f1} | 1 | 0 | 0 |
| {f2} | 1 | 0 | 0 |
| {f3} | 1 | 0 | 0 |
| {x} | 1 | 3 | 3 |
| {x,f2} | 3 | -2 | 0 |
| {x,y} | 1 | 1 | 1 |

Figure 19

Table 4. Trace of Function iterative-euler on the minimal candidate $X$

| Step | Y | sum | Components |
|---|---|---|---|
| 1. | {d,e,c,y,b,a} | 1 | 2 |
| 2. | {e,c,y,b,a} | 2 | 1 |
| 3. | {c,y,b,a} | 2 | 1 |
| 4. | {y,b,a} | 2 | 1 |
| 5. | {b,a} | 2 | 1 |
| 5. | {a} | 1 | 0 |

Figure 20

SYSTEMS FOR SOLVING SPATIAL REASONING PROBLEMS VIA TOPOLOGICAL INFERENCE

BACKGROUND OF THE INVENTION

1. Field

This invention is generally concerned with manipulation of spatial regions and paths and with manipulation and transformation of data related to spatial regions and paths, the manipulations being based on physical properties of the regions and their relations with properties of nearby regions in a field of regard. It is further specifically concerned with methods of manipulation of such regions and paths, and data relating thereto, based on topological inference with respect to all regions in a space.

2. Background

Spatial planning problems are generally solved by techniques which strongly rely on detailed geometric models. Such techniques tend to be cumbersome with respect to computing. Detailed geometric models tend to be based upon a grid having many thousands of points. A point-by-point analysis or manipulation may become time consuming and complex. Sometimes certain problems may not be addressed this way as it may be impossible to generate a sufficient model. Problems having complex geometries or geometries which are dynamic in time are examples of those which may not work well with the techniques.

For some classes of problems, it is not a requirement that a detailed geometric model be formed. Instead, these problems may be addressed by techniques which rely on topological inference. For example, if a rule base requires that certain regions do not overlap, the exact geometries of the regions is unimportant. Consideration should only be given to the fact that they do not contain any common area. Although this type of problem is typically addressed by common geometric techniques, those techniques may be overly complex. The present invention relates to techniques of topological inference. There is no requirement for the complex geometry of any regions of interest to be known or defined as models.

SUMMARY OF THE INVENTION

This invention includes systems for determining topological properties of sets of regions in two-dimensional spaces and providing for manipulation of regions and paths within that space. This invention displays considerable novelty in the fact that the methods use purely topological properties of spatial regions and do not require geometric computation. Known methods which may be employed to engage similar problems generally rely on complex geometrical computations. Consequently, systems of the present invention avoid problems arising from numerical instability, representing complex geometries, and complex implementation normally associated with geometrical computation. The invention comprises systems for determining spatial manipulations and properties for at least the following three topological situations, among others:

1) maximal intersections The system determines all maximal sets of regions with a common intersection; an arbitrary set of regions has a common intersection if and only if it is a subset of one of these maximal sets 2) minimal intersections Given a fixed universe of regions, the system determines all minimal sets of regions such that there exists a point falling only in these regions and no others within the universe. For an arbitrary set of regions, there exists a point outside all of them if and only if there is a minimal intersection which is disjoint from it.

3) minimal skeleton Given a fixed universe of regions or a field of regard, the method computes a graph which models all minimal topological paths through the space.

As input, the systems require hypergraph data whose contents are comprised of physical attributes of regions of interest; specifically a hypergraph whose nodes are the regions, edges are pairwise intersections, and hyperedges are all sets of region triples which have a common intersection.

Systems make the following assumptions: firstly, that regions are compact and simply connected; and secondly that any overlap of a pair of regions is a single connected region.

OBJECTIVES OF THE INVENTION

It is a first object of the invention to provide systems based on topological inference.

It is an object of the invention to provide systems of manipulating spatial regions and paths in accordance with topological inference techniques.

It is a further object of the invention to provide systems of determining preferred regions and paths with respect to a predetermined rule base.

It is still further an object of the invention to provide systems of determining which sets of regions may have a preferred characteristic according to a rule base.

It is still further an object of the invention to provide systems of determining a preferred terrain use in accordance with a predetermined rule base.

It is still further an object of the invention to provide systems of determining a preferred frequency allocation scheme for a mobile radio network.

It is still further an object of the invention to provide systems of determining a preferred assembly procedure in accordance with an assembly rule base.

A better understanding can be had with reference to the detailed description of Preferred Embodiments and with reference to the appended drawings. These embodiments represent particular ways to realize the invention and are not inclusive of all ways possible. Therefore, there may exist embodiments that do not deviate from the spirit and scope of this disclosure as set forth by the claims, but do not appear here as specific examples. It will be appreciated that a great plurality of alternate versions are possible.

BRIEF DESCRIPTION OF THE DRAWING FIGURES

These and other features, aspects, and advantages of the present invention will become better understood with regard to the following description, appended claims and drawings where:

FIG. 1 is a routine used for computing an ordering σ of a set of edges P according to a set of hyperedges T;

FIG. 2 shows functions three-adj and lex-greater for deciding adjacency of hypergraph edges and for determining the lexicographic ordering of labels of two edges;

FIG. 3 is a function to find all maximal three-cliques using a reverse elimination procedure;

FIG. 4 is an example of a function which generates all candidates for minimal intersections;

FIG. 5 Is an example of a procedure for computing the number of components in the regions overlapping a set X;

3

Figure 6:
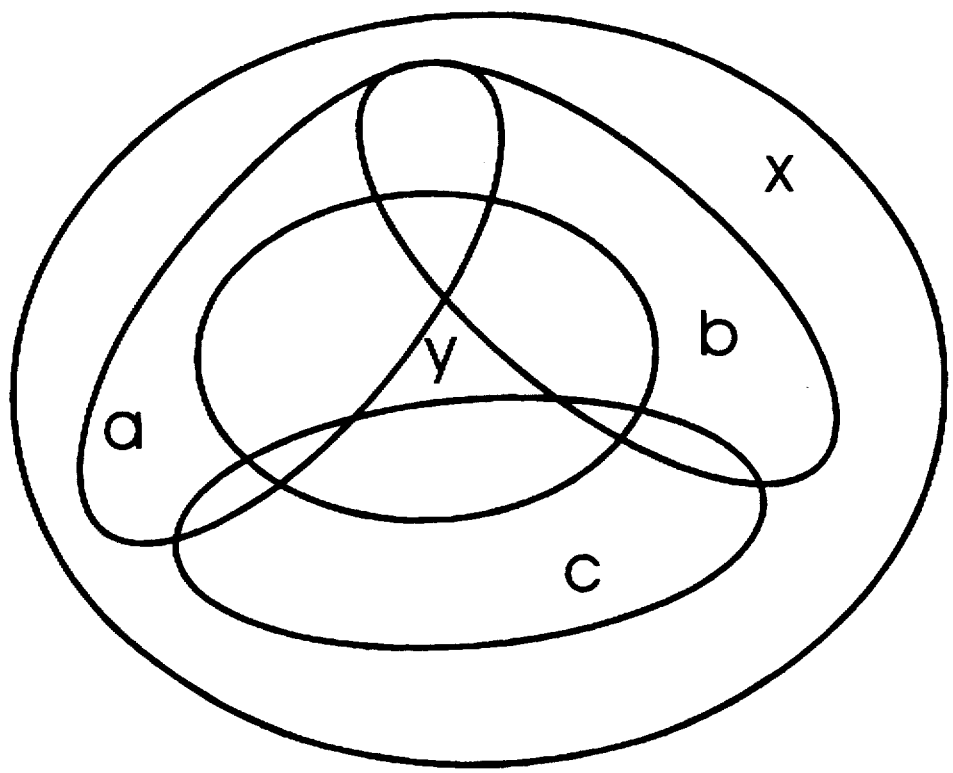
Figure 9:
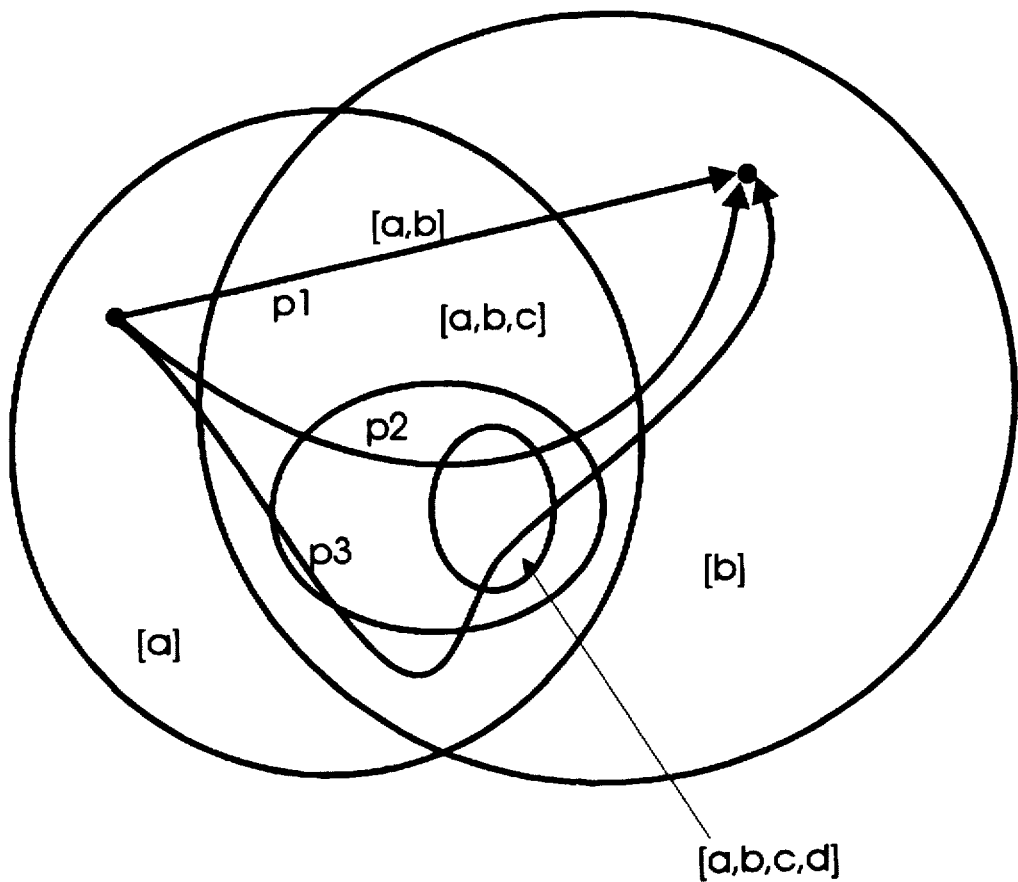
Figure 12:
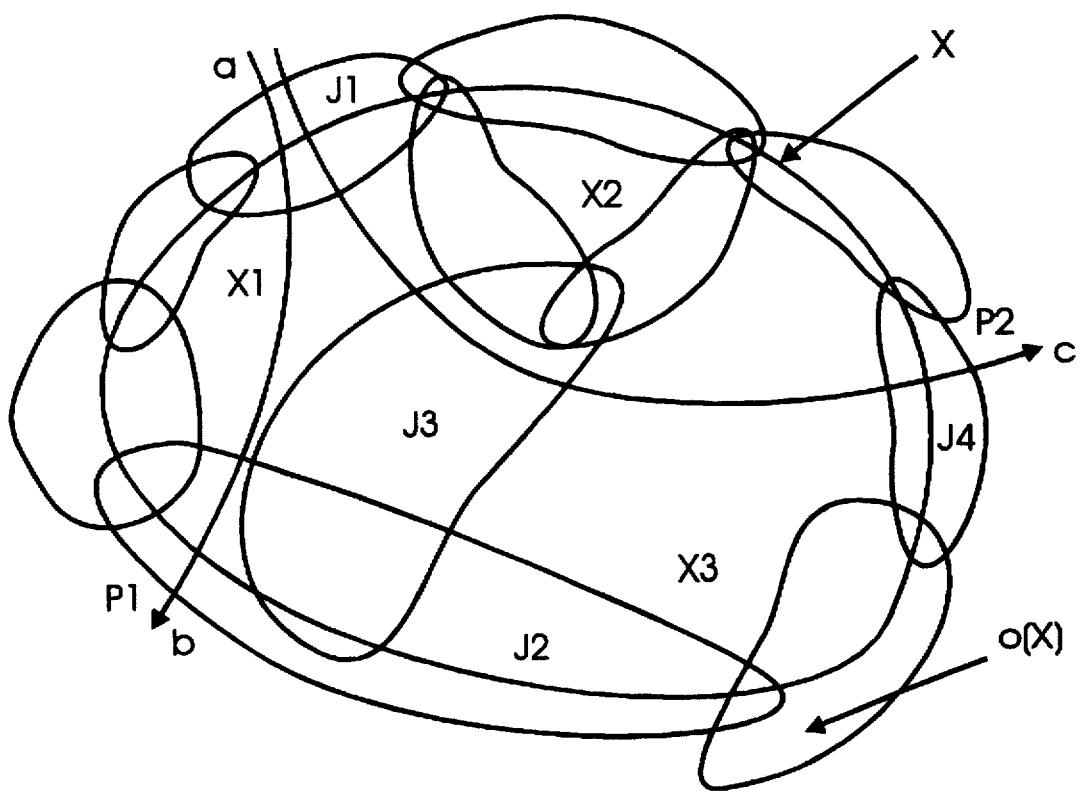
Figure 13:
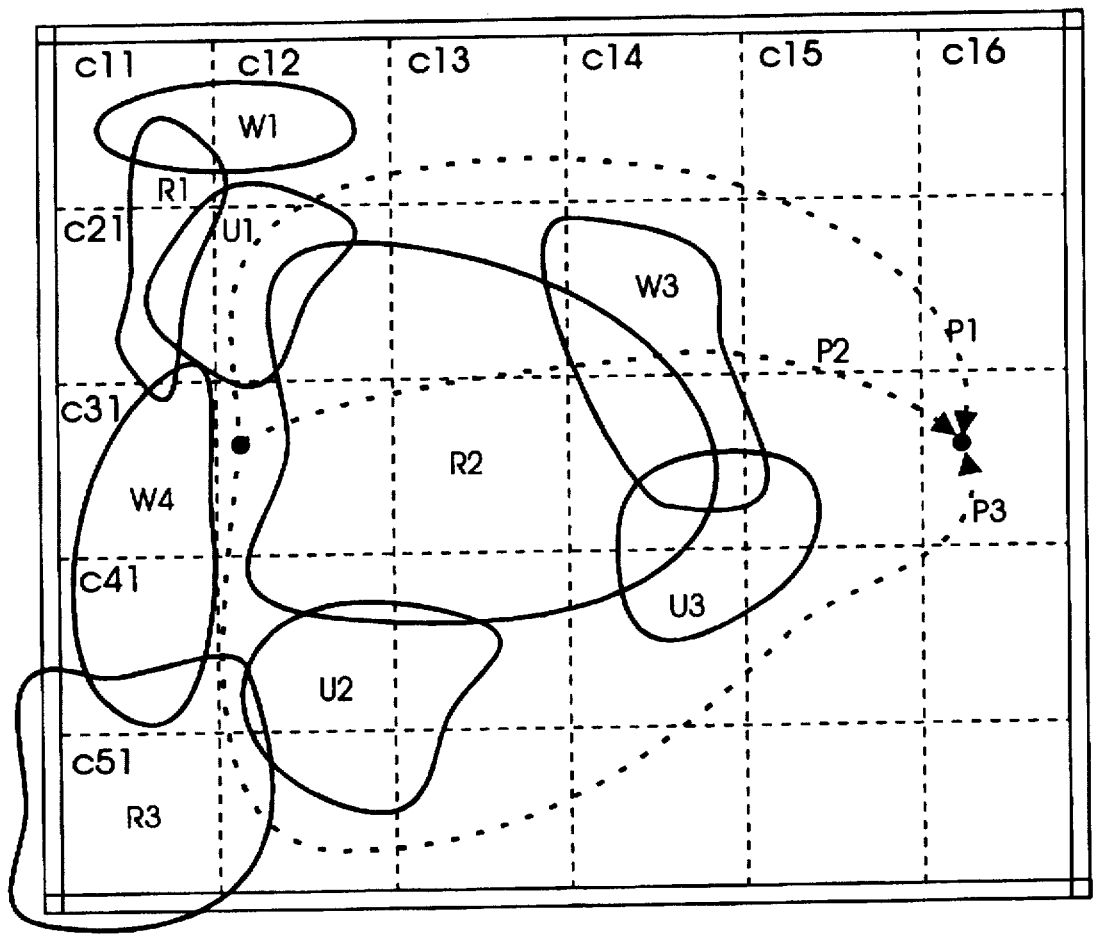
Figure 14:
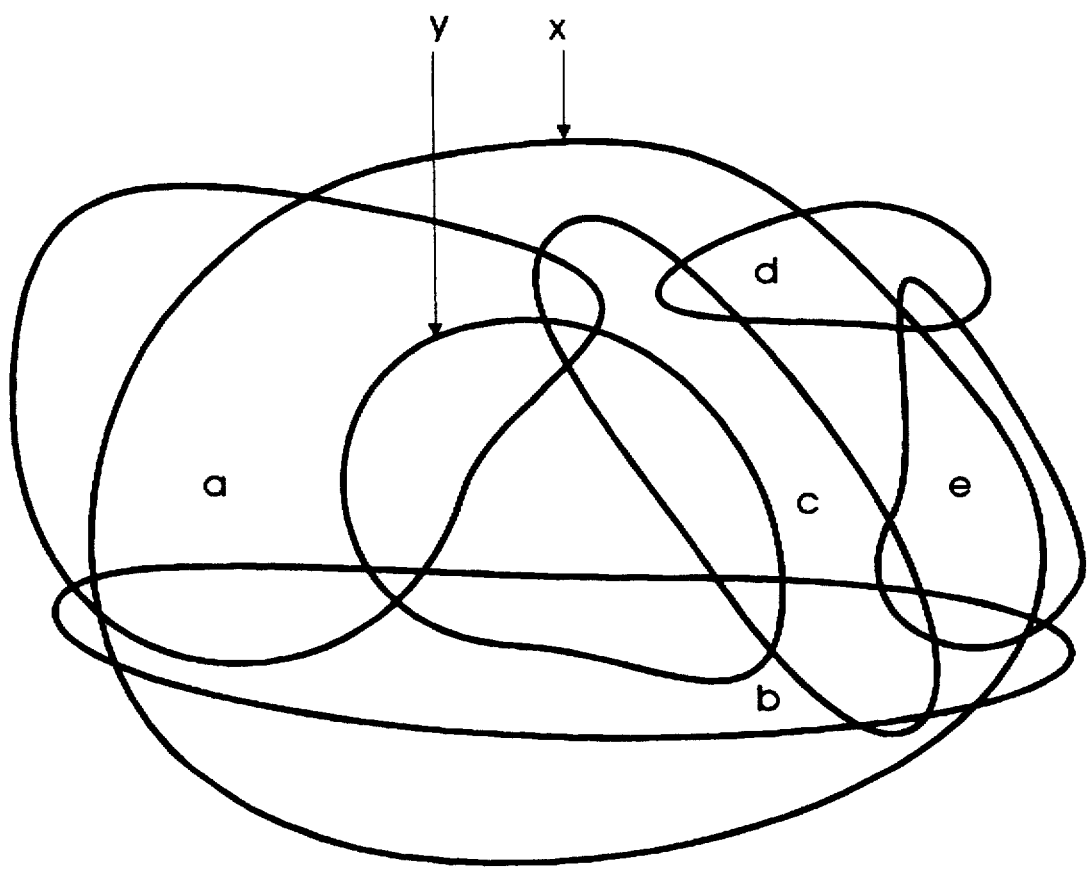
Figure 15:
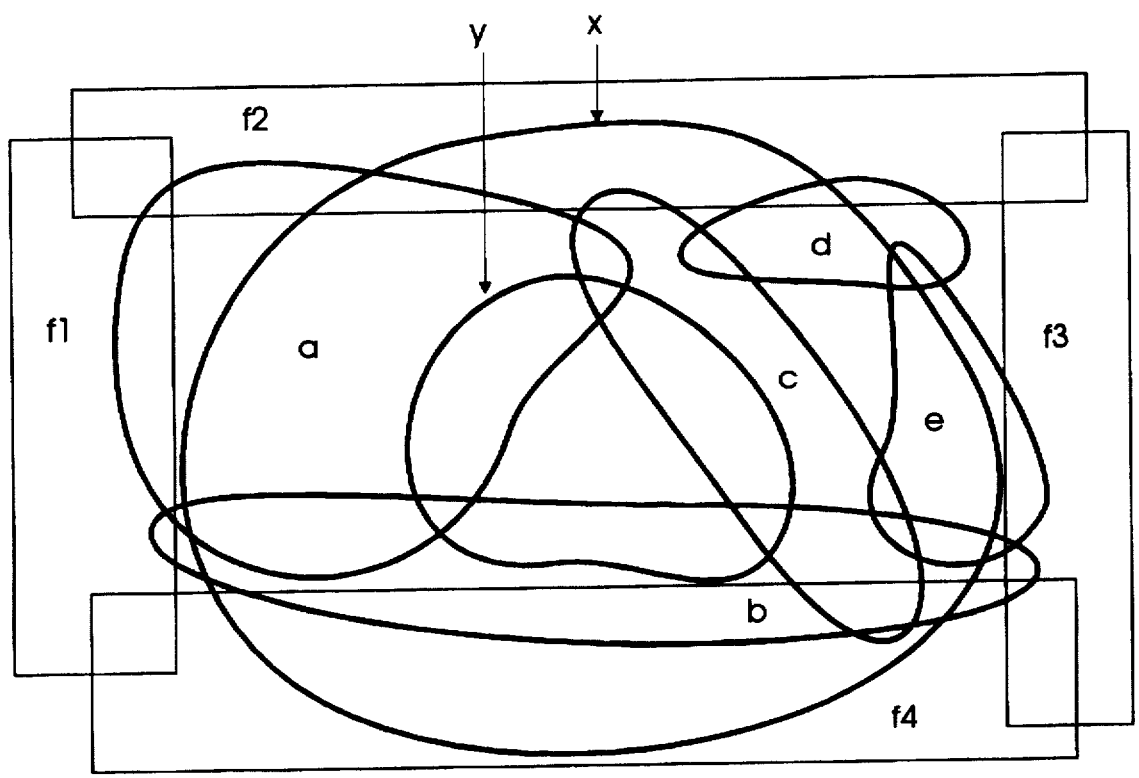
Figure 16:
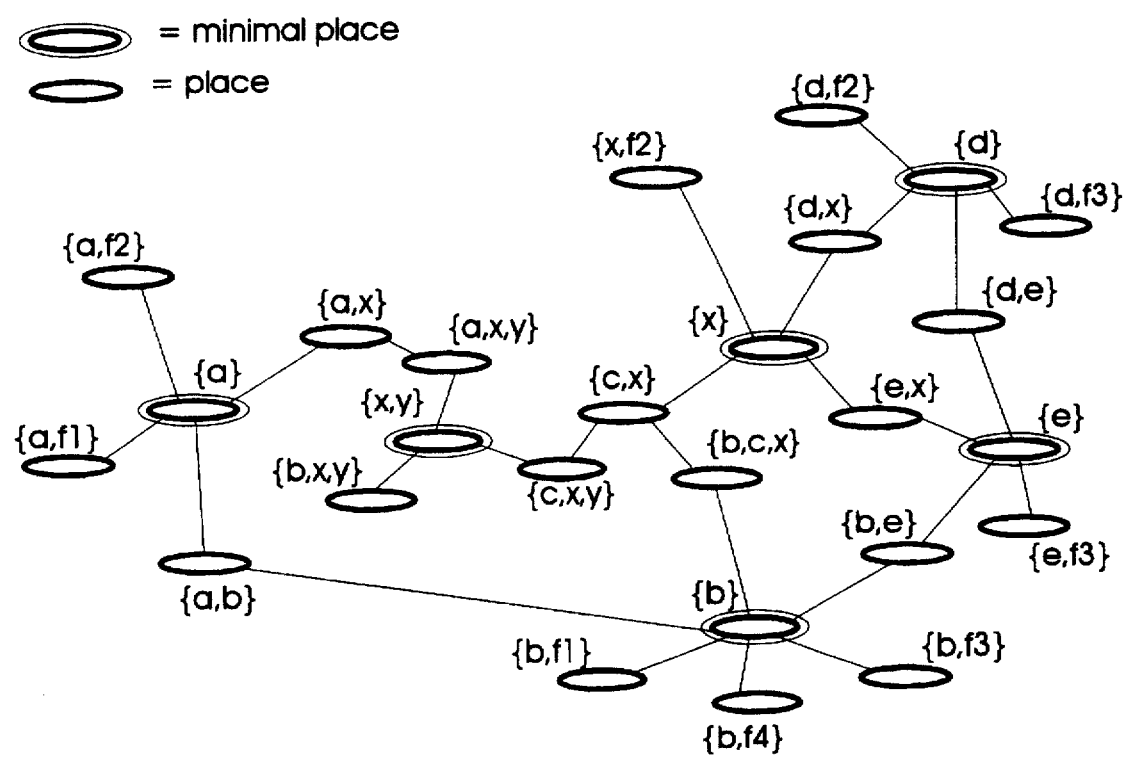

FIG. 6 is an example scenario where certain regions overlap other regions creating intersection regions;

FIG. 7 is a routine Function order2, modified to ensure that ordering allows a simplified computation of Euler characteristics;

FIG. 8 Is a Function iterative-euler which makes use of the ordering σ to avoid recursion. It assumes that Y is non-empty and that each region in Y actually intersects all regions in X;

FIG. 9 Shows examples of different paths between a pair of points;

FIG. 10 shows an example of a procedure for computing all candidates for places in minimal paths;

FIG. 11 is a method for filtering place candidates and retaining only those in a minimal path;

FIG. 12 shows how serious problems can arise when the simply connected condition is not satisfied;

FIG. 13 illustrates an example problem in determining where should a gas pipeline or other continuous connection between a start and destination be laid;

FIG. 14 is an illustration of an example scenario;

FIG. 15 is an illustration of an example scenario with a frame;

FIG. 16 is a graph showing the adjacencies of places in the minimal skeleton, place {b} has two disjoint regions whose connectivity is ambiguous;

FIG. 17 is Table 1 an execution trace of the function order on the example;

FIG. 18 is Table 2 an Execution trace of function eliminate on the example, using the ordering produced by function order;

FIG. 19 is Table 3 with candidates for minimal intersections and their characteristics. The actual minimal intersections are x and xy; and FIG. 20 is Table 4 which shows a trace of the execution of a function on an example.

PREFERRED EMBODIMENTS OF THE INVENTION

In accordance with each of the preferred embodiments of the invention, there are provided systems for manipulating spatial regions and paths therein in accordance with topological inference techniques. It will be appreciated that each of the embodiments described may include various method, apparatus and article of manufacture versions and that the method, apparatus and article of manufacture of one preferred embodiment may be different than method, apparatus and article of manufacture of another embodiment. Indeed, one will appreciate the great plurality of possible embodiments and combinations thereof which will all fall within the scope of the claims appended hereto this specification.

Systems of the invention generally relate to computer systems and may include one or more of methods, apparatus and articles of manufacture. Methods are comprised of four general steps, in particular: generating input data, inputting data into a computer, applying transformation functions to the data, and applying output information to an output device. Apparatus of the invention are essentially comprised of: at least on input device, a computer storage system, a programmable processor, and at least one output device. Articles of manufacture of the invention are comprised of a computer usable medium having computer readable code embodied therein.

4

1. Topological Inference Problems

This invention concerns several techniques for solving a plurality of spatial reasoning problems using topological inference. An example problem addressable by this system is a determination as to topological properties of a certain set of regions in a field of regard; and specifically, a region's intersection characteristics with respect to its having a simultaneous intersection or not. Such questions occur frequently in many applications; three examples are presented herein. A first example relates to planning for uses of terrain regions which are consistent with uses of nearby terrain regions with respect to some predetermined rule base. A second example relates to frequency allocation of spatially distributed radio transmitters. Finally, a third example relates to an assembly sequence in an automated assembly system.

In current technology, it is often necessary to perform elaborate geometric computation to obtain such topological information. This geometric computation requires cumbersome algorithms, suffers from numerical instabilities, scales poorly to large problems, and has difficulty dealing with non well-behaved curved shapes such as may occur in nature. Topological methods which are the object of this invention address these problems in an elegant and heretofore unknown way.

1.1 Inference in Geographical Information Systems

A Geographical Information System (GIS) can be used to represent information about terrain and uses of terrain. Information relating to physical attributes of certain regions can be collected in a manner such that the regions satisfy the following properties: 1) they are simply connected; and 2) any pair of regions overlaps in at most one simply connected region.

Databases of a GIS would store sets of physical attributes of regions of interest within a field of regard. For example, all polluted regions, all forest, all regions which are for sale, all construction zones of different types, all publicly owned areas, etc.

For the application of the method presented here, the GIS must also provide the set of all possible simultaneous intersections of three regions. These can either be stored in a file, or computed on demand using geometric intersection operations.

This invention applies to using a GIS for planning the placement of new construction or installations. This planning process involves answering the following two types of queries, both of topological nature. The first concerns the existence of simultaneous intersections, for example:

> Find a region within the city of Lausanne, within a forest, within a construction zone of type A, inside a protected groundwater area, on public land?

as may be required for planning a public playground and which could be solved by generating candidate sets of regions and keeping those which in fact do have a common intersection.

The second concerns the existence of points outside a certain set of regions, for example:

> Find a region which is outside of any polluted area, outside of any city, free of zoning restrictions and not used for farming.

as may be required for planning a ballooning event, and which is solvable using method of the invention by first finding the set of minimal intersecting regions and then testing whether any of them is free of any region of this type.

This method can also solve many but not all mixed queries in which there is a mixture of negated and unnegated conditions. The third type of query concerns path planning, for example:

> Where would it be possible to lay a gas pipeline between Lausanne and Geneva without crossing an urban area or a groundwater zone?

A method for answering this type of question by first computing a skeleton of the space which represents all minimal paths is presented. This skeleton can then be searched to determine whether there exists a path satisfying all the given criteria.

1.2 Frequency allocation in mobile radio

A second example of an application where topological reasoning is important concerns frequency allocation in radio systems, for example cellular telephones. Here, a number of spatially distributed transmitters can each transmit their signal within a certain irregularly-shaped area whose extent is sensitive to atmospheric conditions as well as variations in the surface terrain, such as buildings. The areas which can be reached by different transmitters overlap in a pattern which is hard to determine exactly as too many variable factors are involved.

The radio system must achieve a good and uniform coverage of the area using only a fixed number of frequencies. When two transmitters whose transmission regions overlap use the same frequency, neither of them is accessible on that frequency in the overlap between them. In general, the number of frequencies is insufficient to rule out any interference between neighboring transmitters, and the key question is which interferences should be tolerated.

For frequency allocation, it is therefore important to know:

what are the maximal sets of transmitters which can exhibit simultaneous interference, and what are the minimal sets of transmitters such that certain points can only be reached by these transmitters.

A frequency allocation scheme can achieve optimal coverage of the space if it first ensures that the minimal sets of transmitters are assigned distinct frequencies so that these areas can be covered as well as possible. If this is possible, it can then try to assign distinct frequencies to the pairs of transmitters which occur most frequently among the maximal sets of transmitters.

The two questions are again of a topological nature and can be answered by the techniques which are the object of this invention. As input information, they require the set of all transmitters as well as all pairwise and triple intersections between their coverage. In a cellular radio system, this information can be readily obtained, for example using a protocol where every active receiver periodically finds three reachable transmitters and transmits this information in coded form to one or all of them. The method for the existence of simultaneous intersections then answers the first question, the one for finding minimal intersections answers the second.

One might wonder why one could not just let the telephones themselves observe the maximal and minimal combinations of transmitters which can be heard simultaneously at different points in space. The following simple calculation shows that such a method would require many more observations than the one given here in order to be accurate. Suppose that each of the t transmitters covers about $1/x$ of the total area of space. Then the probability that an arbitrary probe falls into a particular intersection of n regions is about $(1/x)^n$. If the system is large and spread out we can expect that the number of maximal and minimal regions grows linearly with the number of transmitters. Thus, on average it will take about $k=t \cdot x^n$ probes to find all maximal and minimal intersections of n regions. For example, when $t=100$, $1/x=0.04$ and $n=8$ then $k=100 \cdot 25^8 = 1.5 * 10^{(13)}$. If there are 10,000 mobile stations it would still take more than $10^{(9)}$ probes by each station to determine the structure, an unreasonably large number.

On the other hand, using the topological method described in this invention requires finding only triples of interfering transmitters. Their number will again grow about linearly with the number of transmitters. We thus require about t triple intersections, each of which will take on average $x^3$ probes to find. Thus, the most pessimistic estimate will be $100 * 25^3 = 1.5 * 10^{(6)}$. With 10,000 mobile stations, we now require only 100 probes, something that could easily be obtained within a matter of several days or possibly even a single day.

1.3 Assembly planning

A third example of an application requiring only a topological answer is planning the motion of objects in space. This problem arises in many contexts, especially in robotics and automatic assembly. As an example, the problem of generating a feasible order in which to assemble a product is considered. Generating such a sequence requires depends on a rule base or set of precedence constraints that state which part must be assembled before another one. These precedence constraints are governed by the topology of the configuration space for moving a part into its position without colliding with already assembled parts. In current technology, generating these constraints is hard not only because it requires complex geometric computation, but also because in the worst case every possible ordering of assembly steps must be evaluated for possible conflicts.

Using the method which is the object of this invention, precedence constraints on assembly order can be generated efficiently. It involves applying the method for computing minimal paths to the configuration space for moving a particular part into the final product assembly containing all other parts. The method generates a graph representing all paths which intersect a minimum number of regions, i.e. which generate collisions with a minimum number of parts. Every one of these paths then corresponds to a feasible conjunction of assembly constraints for this part. By repeating the process for all parts, a complete graph showing all assembly constraints is obtained.

2 Notation

In the description of the invention, the following notation is used:

lower-case letters denote regions of space: $r_i$ upper-case letters denote sets of regions: X Greek letters denote points in space: $\alpha$ Furthermore, the following shorthand is used:

$\cdot \cap X \equiv (\cap_{x \in X} x)$ and $\cdot \cup X \equiv (\cup_{x \in X} x)$ The function r(P,N) is defined to be the set of points falling within all regions in P and outside of all regions in N. This set is herein referred to as a place since it does not necessarily have the same properties as the original regions. A place is called consistent if and only if $P \cap N = \{\}$.

All methods are valid for two-dimensional space taking as input the hypergraph $G = (R,P,T)$ where R=the set of regions P=the set of intersecting region pairs T=the set of intersecting region triples 3 Existence of simultaneous intersections A first step detects unambiguously whether any given regions of a set have a simultaneous intersection or not is presented. The step computes a complete set M of maximal simultaneous intersections. The existence of a set of a simultaneous intersection of all regions in a set X is then decided by the fact that the simultaneous intersection of the regions in X exists if and only if X is a subset of some maximal intersection in M.

M is computed using the following theorem, which follows from algebraic topology:

Theorem 1 Given a set of regions R={$r_1, r_2, \ldots, r_n$} in 2 dimensions such that 1. any pair of regions ($r_{\{i1\}}$, $r_{\{i2\}}$) has a single simply connected intersection, and
2. any triple of regions {$r_{\{i1\}}$, $r_{\{i2\}}$, $r_{\{i3\}}$} has some intersection, there exists a single, simply connected and nonempty intersection of all regions in R.

Thus, a maximal intersection is a hyper-clique of triple intersections in this hypergraph, i.e. a maximal set of regions such that every triple of them has a simultaneous intersection.

Normally, computing the set of all maximal hyper-cliques would require a computation time which is exponential in the number of regions. However, by exploiting the topology of the graph, the following method computes the set of maximal intersections in time which is linear in the number of triple region intersections, |T|. The method is inspired by a method for finding maximal cliques in an intersection graph modelling one-dimensional intervals of the real line. The most important difference is that it uses a hypergraph indicating triple intersections, where earlier and unsuccessful attempts at generalization have used ordinary graphs.

The method is based on two steps. The first is to compute an ordering σ of the set P of pairwise intersections (edges of the hypergraph) using Function order shown in FIG. 1. The second is a reverse elimination of the pairwise intersections in the order of σ. The ordering has the property that whenever an edge is eliminated from the graph, all edges which are adjacent to it through a hyperedge form a hyper-clique. For a hypergraph whose edges have arity 3, this property is called three-simplicial. As a consequence, all maximal hyper-cliques must occur among the hyper-cliques found in this way.

Function order uses two subfunctions for deciding three-adjacency and for finding the lexicographically highest label. They are shown in FIG. 2. Adjacency of hypergraph edges is computed using the Function three-adj. Lexicographic comparison is decided by the comparison function lex-greater, which assumes that both l1 and l2 contain the labels as a list sorted in decreasing order. As an example of an ordering, (7)>(653)>(65).

The elimination order a constructed by function order is then used to find all maximal cliques using the reverse elimination procedure eliminate shown in FIG. 3, which returns a list of all maximal three-cliques.

The set M of all maximal consistent region intersections is obtained by a function similar to the following, where the hypergraph G=(R, P, T) is taken from a data storage system or computed on demand:

Function maximal-intersections (R,P,T)
σ→order P,T)
M→eliminate (P,T, σ)
I→any regions r∈R not involved in any pair
return M∪I The system decides whether any set of regions X has a simultaneous intersection by testing whether X is a subset of one of the sets in M. The following function carries out this test:

```
function intersects? (X,M)
  while M ≠ { } do
    begin
      if X ⊆ first (M) then return (true)
      else M ← rest (M)
    end
  return (false)
```

4 Generalizing to more than 2 Dimensions

The systems of this invention have been defined for two-dimensional spaces. Now their generalization to spaces of d dimensions, where d>2 is described.

The input to the method must now be a hypergraph G=(R, P, $I_3$, $I_4$, ..., $I_{\{d+1\}}$), where $I_{\{k\}}$ is the set of all intersections of k regions.

The set of maximal intersections is now the set of maximal {d+1}-cliques. Function order now orders the set of hyperedges $I_{\{d\}}$, whose adjacencies are given by the hyperedges $I_{\{d+1\}}$ otherwise using exactly the same scheme shown in functions order. Function eliminate then eliminates the hyperedges in $I_{\{d\}}$ and constructs the maximal {d+1}-cliques, again using exactly the same scheme shown in function order.

5 Minimal intersections

A novel method which is capable of deciding, for any combination of regions, whether there is a point outside of all of these regions follows. It is based on computing a set m of minimal region intersections. Testing whether there is a point outside of all regions in an arbitrary set X then amounts to testing whether there is a set Y∈m which has no region in common with X, i.e. X∩Y={ }.

The set of minimal intersections is found by the following consideration. Suppose that X is a minimal intersection, i.e. there is a point which falls within all regions in X and no other regions, but no point which falls only within a subset of X. Let Y be the set of all other regions which have some intersection with X. Let ∩X be the intersection of all regions in X, and ∪Y be the union of all regions in Y. Then the intersection Z=(∩X)∩(∪Y) must be different from ∩X, since the point which falls only within ∩X cannot fall into this intersection. Furthermore, it is possible to show that if X is minimal and nonempty, Z must be multiply connected. Multiple connectedness can be more formally characterized using the notion of homology groups. In n-dimensional space, there can be n-1 nonempty homology groups of orders 0, 1, ..., n-1, ($H_0, H_1, \ldots, H_{\{n-1\}}$). The rank of the zeroth homology group is equal to the number of disjoint components of the set minus one, i.e. the number of one-dimensional "holes" if the sets were composed of intervals on a line. Similarly, the rank of the n-th homology group is equal to the number of (n-1)-dimensional "holes". In two dimensions, a set is multiply connected if and only if the rank of its first homology group is non-zero: |$H_1$|≠0. In two dimensions, the rank of the first homology group can be computed using the Euler characteristic:

$$E(X)=|H_1(X)|-|H_0(X)|$$

since |$H_0(X)$| is the number of components minus 1 and can be computed by other means.

5.1 Generating candidates

The set m of minimal intersections is computed by a generate-and-test method. The generation of candidates is constrained by the fact that every set X which is a minimal intersection must be the intersection of three maximal cliques. FIG. 4 shows an example of a function which generates all candidates for minimal intersections following this method.

5.2 Computing the overlaps

Whether a candidate is indeed a minimal intersection depends on the topology of the set of regions which overlap it. The set o(X) of regions which have a simultaneous intersection with all regions in the set X is the union of all the maximal intersections which contain X as a subset, minus X itself:

$$o(X) = \cup \{y | (y \in M) \ (X \subset y)\} - X$$

This can be implemented for example by the following function:

```
function overlap (X,M)
    Y ← { }
    For all m ∈ M do
        if X ⊂ m then Y ← Y ∪ m − X
    return Y
```

5.3 Computing the number of components

The number of components in the overlap Y of the intersection of regions X is computed as the number of connected components of the graph G=(V,E) whose vertices V are the regions in Y and whose edges E contain an edge between v1 and v2 if and only if $\exists \ m \in M$ such that $X \cup \{v1,v2\} \subseteq m$.

Any known method for finding the number of connected components of a graph can be used for this purpose; FIG. 5 shows "function-components" an example implementation of this method.

5.4 Computing the Euler Characteristic

In two dimensions, the Euler characteristic is defined as the difference in rank between the first and zeroth order homology groups:

$$E(p(X)) = |H_1(p(X))| - |H_0(p(X))|.$$

The important feature of the Euler characteristic is that it obeys the following equality:

$$E(\cup (X \cup Y)) = E(\cup X) + E(\cup Y) - E((\cup X) \cap (\cup Y))$$

This formula can be applied to a recursive decomposition of a union of regions by eliminating one at a time. Since the topology of each individual region is known to be simply connected, its Euler characteristic is equal to zero and need not be computed in the recursion, i.e. we have:

$$E(\cup (\{r\} \cup Y)) = 0 + E(\cup Y) - E(\{r\} \cap (\cup Y))$$

Thus, the Euler characteristic the intersection of the union of all regions in Y with the intersection of all regions in X can be computed by a recursive function:

```
function recursive-Euler (X,Y,M)
    if Y is empty then return 0
    else
        begin
            Z ← {y ∈ Y|y overlaps X }
            if Z is empty then return 1
            else
                begin
                    f ← first (Z)
                    R ← rest (Z)
                    return Euler(X,R,M) − Euler(X ∪ {f},R,M)
                end
        end
```

The recursive formulation of the Euler characteristic given above has the inconvenience that the double recursion makes its complexity exponential in |Y| in the worst case. Its complexity can be reduced to $O(|Y|^2)$ if the regions can be ordered so that the intersection $(\cap X \cap f) \cap \cup R$ is never multiply connected. In this case, the Euler characteristic of this overlap can be computed using function components as 1-components $(X \cup \{f\}, R, M)$.

Due to the properties of intersection graphs, such an ordering does indeed exist and can be found from the ordering constructed by the function order. Recall that every hypergraph edge eliminated in the ordering is 3-simplicial at the time that it is eliminated from the graph. Suppose that x is a region which has a multiply connected intersection with regions {a, b, c, . . . }. Such an example is shown in FIG. 6, where the four regions {a,b,c,y} overlap x, and the intersection of {y} with the union of {a,b,c} is multiply connected. The edge y-x cannot be eliminated before one of a-x, b-x, c-x, . . . , for otherwise it would not be 3-simplicial. Thus, if we order the set {a,b,c,y} in the order of {a-x, b-x, c-x, y-x} constructed by Function order, it can never occur that the intersection of a region with the remaining ones is multiply connected.

However, note that this argument makes use only of the hyperedges which are actually existing at the moment of elimination, whereas function order takes into account all hyperedges which existed in the original hypergraph. The ordering function can however be modified as follows so that it breaks the ties between the potential hyperedges in favor of those which actually exist at the time of elimination. This is done by adding a secondary label which is constantly updated to reflect the current state of active hyperedges. FIG. 7 shows the modified method.

For evaluating the function Euler(X, Y), we now order the regions in Y as follows: Let X be any region in X. Let Y={a,b,c, . . . } and order the regions in the order of the edges {a-x, b-x, c-x, . . . } in the elimination order used for finding the cliques. This now allows applying the following simplified function iterative-euler, shown in FIG. 8, which assumes that Y is nonempty and that all regions in Y actually overlap ∩X. iterative-euler computes the Euler characteristic of $\cup Y \cap (\cap X)$ in $O(|Y|^2)$ time since components takes linear time and is called exactly once for each region in Y.

5.5 Computing minimal intersections

The method for computing the set m of all minimal intersections proceeds as follows. We assume that a is the ordering of the edges of the input hypergraph produced by function order2, and that M is the set of all maximal intersections computed by function eliminate using this order.

```
function minimal-intersections (M,σ)
    CANDS ← min-candidates (M) ∪ { }
    m ← { }
    For all c ∈ CANDS do
        begin
            o ← overlap (c,M)
            p ← components (c,o)
            e ← iterative-euler (c,o,σ)
            if e + p > 0 then m ← m ∪ c
        end
    return m
```

However, it should be noted that certain elements of m thus computed might not be minimal in the sense that they are subsets of other elements of m. This does not perturb the use of m, but for efficiency reasons it might be advantageous to eliminate these duplicates.

5.6 Use of the minimal intersections

The list of minimal sets allows deciding for any set of regions X whether there is a point falling outside all regions in X. There is such a point if and only if there is a minimal Yεm such that X∩Y={}. Furthermore, there is a point falling within all regions in Z and outside all regions in X if there is a minimal Yεm such that Z⊆Y and X∩Y={}.

Thus, the following method decides whether there is a point within all regions in X and outside of all regions in Y:

```
function inside-outside (X,Y,m)
  c ← {}
  for all i ε m do
    if (X ⊆ i) and (Y ∩ i {}) then
      c ← i
      if c ≠ {} return (true) else return (false)
```

However, this method is not very useful if the empty set is a member of m, i.e. if there is a point which does not fall in any region. In fact, if the empty set was among the minimal sets, then it would necessarily be the only minimal set, and all others would be useless.

Thus, in practice, it is important to rule out this case. In general, points outside of all regions present themselves at the edges of the known regions. For example, at the limits of coverage of a GIS there might be points not classified by any region. In order to avoid considering such points, it is useful to enclose the universe of reasoning by a frame a set of additional regions which cover the space around the regions considered in reasoning, but do not extend into the space where reasoning is desired. FIG. 15 shows the result of adding a frame consisting of four rectangular regions f1 through f4 to the scenario shown in FIG. 14; this example will be described in more detail below.

When the area where reasoning is desired also contains points which are not covered by any region, it is useful to add additional regions which fill these gaps. One way to do this is to systematically cover the entire area by simple regions, for example squares, which overlap their neighbors at their edges. Such a coverage also allows characterizing where intersections found in topological reasoning fall in space. FIG. 13 shows an example where space has been covered with squares c11 through c56 which overlap at their boundaries. Furthermore, the entire scenario has been bounded by a rectangle of four regions. Note that both the rectangle and this boundary do not have to be explicit regions for reasoning, but can be a coordinate grid whose intersection relations are generated from the coordinates of the regions.

6 Planning Paths

Besides the pure existence of regions, it is also important to know how they are connected. For example, if a GIS is used in planning a gas pipe or a cable, it should also provide information on the possible paths for such a connection. The general query for this type of question would be:

Find a path P linking any starting point αεr($P_s,N_s$) to any endpoint βεr($P_e,N_e$).

A geometric path p, which is a set of points, is distinguished from the topological path P, which is a set of places. A geometric path p can be broken into a sequence of segments ($s_1, s_2, \ldots, s_k$) such that each segment $s_i$ falls entirely within a different place $r_i$. The topological path P corresponding to p is then the sequence of places P=($r_1,r_2, \ldots, r_k$). FIG. 9 shows examples of paths and their topological equivalents. However, in general there can be infinitely many different paths satisfying such a query. Three such paths are shown in FIG. 9. p1 is the most "direct" path, while p2 and p5 are examples of the infinitely many other paths which are possible by also traversing other regions. If a single solution is required, it is generally best to give the least complex path (in this case, p1); if a path is required to traverse particular regions it could be constructed by composing least complex paths for different subsegments. Furthermore, since any point in r(X∪Y, {}) also falls in r(X, {}), a path can often be represented topologically in many different ways. Thus, the topological equivalent of p1 could be P1=(r({a},{}), r({a,b},{}), r({b},{})) but also P1=(r({a}, {}), r({b},{})). To avoid these ambiguities, only minimal topological paths are considered. They are defined as follows:

Definition 1 A minimal topological path $P_{min}$ from any starting point αεr($P_s,N_s$) to any endpoint βεr($P_e,N_e$) is a sequence of places $r_1(P_1,N_1), \ldots, r_k(P_k,N_k)$ which satisfies the following conditions:

1. $P_{min}$ does not contain any cycles, i.e. there is no place which occurs twice.
2. the places cover all subsegments and are minimal with respect to a universe U, $s_i \subseteq r(P_i,N_i)$ and $N_i$=U−$P_i$.
3. there is no path P'=($r_1, \ldots, r'_m(P'_m,N'_m), r_{\{n+1\}}, \ldots, r_k$), where a subsequence $r_m, \ldots, r_n$ has been replaced by a single place $r'_m$, such that $P_m \subset P_j$ for all jε[m .. n].

For example, in FIG. 9, P3 is not a minimal path because it contains a cycle, and P2 is not a minimal path because P1 is an equivalent path where the subsequence ({a,b},{a,b,c}, {a,b,c,d},{a,b,c},{a,b}) has been replaced by the single region {a,b56 . P1 is indeed minimal; the possible simplified P' which might satisfy condition (3) is P'=(r({a},{}), r({b}, {})) which does not satisfy condition (2). Note that between two points, there can be several but only finitely many minimal paths. Furthermore, for any precise path there is only a single minimal path which models it.

6.1 Regions involved in minimal paths

Because of the following theorem, it is straightforward to compute the set of all regions involved in minimal paths:

Theorem 2 Let P be a minimal path between points α and β. Then any intermediate place $r_i$, iε[2 .. (|P|−1)] of P is overlapped by a set of regions which either has several components or is multiply connected.

Thus, all intermediate intersections which can appear as components of any minimal path are characterized by the fact that their overlap is nonempty and not simply connected, i.e. they can be found by purely topological inference similar to the negation rule.

By the definition of minimal intersections, any point α is member of some minimal intersection Xεm, so that the intersections $r_1$ and $r_{|P|}$ containing the start and endpoints can be chosen to fall within the set m.

Under the assumption that the entire space is covered by some region, the following method computes all regions involved in minimal paths. It is based on a generate-and-test paradigm which first generates all candidates for such regions, and then filters only those which fulfill the topological criteria described by Theorem 2. The generation is based on the fact that it can be shown that all intersections which fulfill the criteria of Theorem 2 are intersections of two or three maximal three-cliques. FIG. 10 shows an example of a method which generates a complete list of all candidates.

The function path-places shown in FIG. 11 filters the set of all candidate places to include only those where the set of regions overlapping it fulfills the topological criteria stated in Theorem 2.

6.2 Adjacency

Place adjacency is defined as follows:

Definition 2 Two consistent places r($X_1,Y_1$) and r($X_2, Y_2$) are directly adjacent if and only if one of $X_1,X_2$ is not minimal (|$H_1$(o($X_1$))|≠0 or |$H_1$(o($X_2$))|≠0) and either $X_1 \subset X_2$ and ¬ ∃place Y such that $(X_1 \subset Y \subset X_2)$, or
$X_2 \subset X_1$ and ¬ ∃place Y such that $(X_2 \subset Y \subset X_1)$.

It is then possible to show:

Theorem 3 Let $r_1$ and $r_2$ be two simply connected places and members of a minimal path, and let $r_1$ and $r_2$ be directly adjacent. Then there exists apath between any point a $\epsilon r_1$ and any point $\beta \epsilon r_2$ which falls entirely within the union of $r_1$ and $r_2$, which shows that all direct adjacencies defined in this way in fact correspond to direct adjacencies in reality. On the other hand, it is also possible to show that every minimal topological path is a sequence of direct adjacencies. Thus, the direct adjacencies defined in Definition 2 are exactly the adjacencies making up all minimal topological paths.

The following method connects the set of regions involved in minimal topological paths into a graph whose paths correspond exactly to all minimal topological paths among the set of regions:

```
function skeleton-edges (P)
edges ← { }
for all p1 ∈ P do
    if p1 ∉ m then
        for all p2 ∈ P do
            if p1 ⊃ p2 and ¬∃ p3 ∈ P (p1 ⊃ p3 ⊃ p2) then
                edges ← edges ∪ (p1,p2)
return edges
```

6.3 Method to compute the minimal topological skeleton

A method for computing a minimal topological skeleton which represents all minimal topological paths among a set of regions, as defined above is now given. It is assumed for this that every point in the space is entirely covered by some region. Function skeleton then computes the minimal skeleton:

```
function skeleton (R,P,T)
σ ← order (P,T)
M ← eliminate (P,T,σ)
C ← min-candidates2 (M)
P ← path-places (C,M,σ)
E ← skeleton-edges (P)
return S = graph with vertices P and edges E
```

6.4 Region Topology

The connectivity between regions in the minimal skeleton is given by the direct adjacency relations which hold between regions. This is valid only under the assumption that places are simply connected.

As FIG. 12 shows, serious problems can arise when this condition is not satisfied. The minimal place X consists of three disjoint parts, x1, x2 and x5. Topological criteria alone do not allow distinguishing among the components nor computing their connectivity. Furthermore, path P2 would not count as a minimal path, even though it cannot be replaced by a simpler equivelent. First, topological criteria alone cannot distinguish among the different components of a place. While different components are separated by joined places and these are in fact found by the criterion of Theorem 2, there is no general algorithm for deciding which of these joined places are adjacent to the same component of a place.

As shown in FIG. 12, this can have serious consequences. Path P1 connects place a to b via the sequence a →j1→x→X j2→b, and path P2 a to c via a →j1→x→j3→x→j4→c. Since topological reasoning cannot distinguish the different subregions of X, it is unable to show that P1 and P2 are possible but that P': a→j1→x→j4→c does not exist.

Fortunately, in practice this problem is easy to detect and correct. It is detected when the topology of the overlap of X is more than doubly connected, i.e. $|H_1(o(X))| \leq 2$. Two methods can be used to avoid this case. The first is to subdivide some regions in the set X in order to make it smaller. Such a subdivision could be a recursive quartering such as in quadtrees, carried out until the multiple regions disappear. The second method would be to add new regions such that they do not all cover all different subregions. This solution is more difficult to implement for a particular case, as it requires knowing where in space the multiple regions fall. A practical solution would be to cover the entire space with regular subregions, as has already been mentioned earlier for avoiding points not covered by any regions. This solution can be more efficient than subdivisions when there are many places which have disjoint regions, as it solves the problem for all of them simultaneously.

6.5 Method of determining minimal paths

The minimal skeleton of a set of regions can be used to compute minimal paths between a starting point α and an endpoint β as follows. First, α and β must be mapped to the most specific place in the minimal skeleton which contains them. The minimal topological paths are now found by a graph searching procedure which finds all paths between the starting and ending places which do not contain any cycles. Each of these paths is a minimal topological path according to Definition 1.

In a GIS application, a typical task could be to find a path to connect two regions which avoid certain obstacles. For example, a cable should not pass through water, tunnels, railway lines, etc. Such problems can require very complex geometric computation. FIG. 13 shows an example of such a problem: assume that we have to route a gas pipeline between a source and a destination. For minimum cost, the pipeline should avoid the three urban areas u1 through u3, the four water areas w1 to w4, and the three nature reserves r1 through r3. In order to avoid points which do not fall within any region, space has been covered with squares c11 through c56 which overlap at their boundaries. Furthermore, the entire scenario has been bounded by a rectangle of four regions. The minimal skeleton for this example can be computed using all simultaneous triple intersections among regions as well as the covering squares and the rectangles of the frame.

Under the criterion that regions in the scenario are to be avoided by the path where possible, any optimal path is also a minimal path representable in the skeleton. The minimal skeleton can be used to enumerate what paths are topologically possible. The most optimal ones can then be further elaborated using geometric computation or robot path planning techniques.

FIG. 13 shows three examples of different minimal topological paths which could be imagined in this scenario. For example, path p2 would be represented topologically as follows:

p({c32})→p({c32,R2})→p({c32,R2,c33})→p({c33,R2})→p({c33, R2,c34})→p({c34,R2})→p({c34,R2,W3})→p({c34,W3})→ p({c34})→p({c34,c35}) p({c35})→p({c35,c36})→p({c36})

Using geometric computation, solving such a planning problem can involve enormously complex computations. Since the goal is not to find a path which avoids all obstacles, but only to mininize the number of obstacles which must be crossed, techniques of collision-free motion planning developed in robotics are not directly applicable to this problem; they would in fact have to be applied problems where different combinations of obstacles have been removed until a collision-free path exists. This procedure would have exponential complexity in the number of obstacles crossed in the final solution. Another alternative is to compute a region structure similar to the minimal skeleton, but by geometric methods. Because of the complicated shapes, this is likely to be much more complex than topological computation.

7 Examples of execution 7.1 Maximal intersections

To illustrate examples of execution of these techniques, consider the scenario shown in FIG. 14. It contains 7 regions: a, b, c, d, e, X and y. The intersection hypergraph has the following 16 edges:

P={a-b, a-c, b-c, b-e, c-d, c-e, d-e, a-x, b-x, c-x, d-x, e-x, a-y, b-y, c-y, x-y} and the following 14 hyperedges:

T={a-b-x, a-b-y, a-c-x, a-c-y, b-c-e, b-c-x, b-c-y, a-x-y, b-x-y, c-x-y, b-e-x, c-d-x, c-e-x, d-e-X}

FIG. 17 contains Table 1 which shows the 16 steps of Function order on this example. The elimination proceeds in the opposite order. It involves the complication that whenever an edge is eliminated, all the 3-adjacent hyperedges in which it participates also disappear, thus possibly affecting other adjacencies. For example, eliminating the edge b-c also eliminates the hyperedge b-c-x and thus the 3-adjacency between edges b-x and c-x.

Table 2 shows a trace of this elimination. The third column of the table shows edges which are adjacent to those being eliminated. Those edges which are double-underlined (for example: a-b) are no longer present because they have been eliminated earlier. Those which are stricken out (for example: a-b) are no longer 3-adjacent because the hyperedge that would make them 3-adjacent has already been eliminated from the graph. In the fifth column of Table 2, the hyperedges which are being eliminated at this step are shown.

The fourth column of Table 2 shows the three-cliques formed by the edge and its three-adjacent neighbors. The maximal three-cliques are marked with an "*" and make up the set of maximal cliques M returned by the system:

M={{d,e,x}, {c,b,x}, {b,c,e,x}, {b,c,x,y}, {a,b,x,y}{a,b,x,y}}

The reader can verify that choosing a different edge as a starting point will lead to an equally valid elimination ordering and an identical set of three-cliques.

Given the set M, the method decides whether an arbitrary set of regions has a simultaneous intersection by checking whether it is a subset of an element of M. For example, {b,c,x} is a subset of {b,c,x,y} and thus there is an intersection of all three regions. On the other hand, {c,d,e,x} is not a subset of any set in M and indeed there is simultaneous intersection of these four regions.

7.2 Minimal intersections

Recall that minimal intersections are not always useful unless the space is enclosed by a frame which rules out points that fall in no region at all. FIG. 15 shows the same scenario given earlier in FIG. 14, except that a frame consisting of regions f1, f2, f3 and f4 has been added. In this new scenario, there are the following maximal intersections:

$M = \{\{d,e,x\},\{c,d,x\},\{b,c,e,x\},\{b,c,x,y\},\{a,c,x,y\},\{a,b,x,y\},$ $\{a,f1,f2\},\{a,b,f1\},\{b,f1,f4\},\{b,c,x,f4\},\{b,f3,f4\},\{b,e,f3\},$ $\{d,e,f3\},\{d,f2,f3\},\{d,x,f2\},\{c,x,f2\},\{a,x,f2\}\}$

Applying Function min-candidates to the set M computed above returns the list of candidates shown in Table 3 in the first column of FIG. 17. Function components returns the number of components of the regions which overlap the intersection, indicated in the second column. The third column gives the Euler characteristic as computed by Function iterative-euler, and the fourth the resulting rank of the first homology group. Six candidates have a non-zero first homology group, they are {a}, {b}, {d}, {e}, {X} and {x, y}. Among these, all are minimal except for the candidate {x, y} which is a superset of {x}. {x, y} will however be important in the context of the minimal skeleton (see below). {b} has a first homology group of order 2, and so its minimal intersection consists of two disjoint parts. FIG. 15 shows that in fact there are two disjoint areas covered only by region b.

In order to illustrate the operation of Function iterative-euler, consider its application on the set {X}. In the example of FIG. 14 for which we have shown the elimination order in FIG. 17, x is overlapped by all other regions, so that Function overlap returns Y={a,b,c,d,e,y}. In the order σ, we find that:

$\sigma^{\{-1\}}(a-x)=15; \sigma^{\{-1\}}(b-x)=14; \sigma^{\{-1\}}(c-x)=10; \sigma^{\{-1\}}(d-x)=3;$
$\sigma^{\{-1\}}(e-x)=6; \sigma^{\{-1\}}(x-y)=11$ so that Y should be ordered as Y={d,e,c,y,b,a}.

7.3 Minimal Skeleton

Among the candidates shown in Table 3, four are not part of the minimal skeleton as the homology groups of what overlaps them are all zero: {b, x} {f1}, {f2} and {f3}. The remaining ones are places which make up the minimal skeleton. Constructing the adjacencies using Function skeleton-edges results in the adjacency graph shown in FIG. 16. It reflects all minimal paths of the scenario in FIG. 15 which do not involve regions which are part of the frame. Note that since place {b} consists of two disjoint components, it introduces some incorrect connectivities into the graph. For example, according to the graph, it would be possible to go from {a,b} to (b,e} without going through any other regions than {a,b,e}. In reality, this is not true, as is clear from FIG. 15. Similar ambiguities exist for place {x}, which even has 3 disjoint components. Both of these inaccuracies are known to be present by the fact that $|H_1(o(b))|<1$ and $|H_1(o(X))|>1$. As discussed earlier, they can be solved by either breaking up regions b and x into smaller parts, for example into quarters, or by adding new regions which only cover part of x or b.

7.4 Extension to arbitrary number of dimensions

The method which is the object of this invention has been defined for two-dimensional spaces. I now describe their generalization to spaces of d dimensions, where d>2.

The input to the method must now be a hypergraph $G=(R,P,I_3, I_4, \ldots, I_{(d+1)})$, where $I_{\{k\}}$ is the set of all intersections of k regions.

The set of maximal intersections is now the set of maximal {d+1}-cliques. Function ndim-order now orders the set of hyperedges $I_{\{d\}}$, whose adjacencies are given by the hyperedges $I_{\{d+1\}}$ otherwise using exactly the same scheme shown in functions order. Function ndim-eliminate then eliminates the hyperedges in $I_{\{d\}}$ and constructs the maximal {d+1}-cliques, again using exactly the same scheme shown in function eliminate.

---

Function ndim-order ($I_d, I_{\{d+1\}}$)
for all p ∈ $I_d$ do label (p) ← { }
j ← |$I_d$|
repeat

```
        p ← element ∈ I_d with the
                    lexicographically highest label
        σ(j) ← p
        I_d ← I_d - p
        for all x in I_d do
            begin
                if (d+1)-adj (x,p,I_{d+1}) then
                    label (x) ← label (x) ∪ {j}
            end
        j ← j-1
    until P is empty
    return σ
end
Function (d+1)-adj (x,y,I_{d+1})
    bits ← x ∪ y
    when every subset {x_1,x_2 ... x_{d+1}} ⊂ bits } ∈ I_{d+1} then
        return true else return false
end
```

The elimination order σ constructed by function ndim-order is then used to find all maximal cliques using the reverse elimination procedure ndim-eliminate shown in function ndim-eliminate, which returns a list of all maximal (d+1)-cliques.

```
function ndim-eliminate (I_d, I_{d+1}, σ)
    C ← {}
    For j ← 1 to σ do
        begin
            p ← σ(j)
            c ← {r ∈ R | (∃ x ∈ I_d) (d+1)-adj (x,p, I_{d+1}) > (r ∈ x) }
            if ¬∃ d ∈ C such that d ⊇ c
                C ← C + c
            I_{d+1} ← I_{d+1} - {t ∈ I_{d+1} | t ⊃ p}
        end
    return C
```

The set M of all maximal consistent region intersections is obtained by a function similar to the following, where the hypergraph G=(R, P, I_3, ... ,I_{d+1}) is taken from databases or computed on demand:

```
Function maximal-intersections (R, I_d, I_{d+1})
    σ ← order (I_d, I_{d+1})
    M ← eliminate (I_d, I_{d+1}, σ)
    I ← any elements of R,P, ... I_{d-1} not subset of any
        hyperedge of higher arity
    return M ∪ I
```

Although the present invention has been described in considerable detail with clear and concise language and with reference to certain preferred versions thereof including the best mode anticipated by the inventor, other versions are possible. Therefore, the spirit and scope of the appended claims should not be limited by the description of the preferred versions contained therein.

I claim:

1. Methods of determining spatial manipulations and properties by applying topological inference techniques to spatial elements, the method being implemented in a programmed computer comprising a processor, a data storage system, at least one input device, and at least one output device, the method comprising the steps of:

(a) generating input data for the programmed computer in the form of a hypergraph, the data being related to a set of physical elements, each element being multi-dimensional wherein, i) said elements having properties including at least: a closed path periphery, an interior portion, and an exterior portion, ii) any two or more elements having additional properties said properties including: a simply connected pairwise intersection, a triple intersection, three-adjacent edges, element intersections, and element unions, iii) the set further having properties, said properties including: a closed path periphery, element intersections, element unions;

(b) inputting the generated input data into the programmed computer through at least one input device for storage in the data storage system;

(c) applying, to the generated input data stored in the data storage system, by means of the programmed computer, i) an ordering step to sort pairwise intersections, ii) a reverse elimination step which eliminates pairwise intersections in that order and finds all maximal simultaneous intersections; and (d) applying resultant data to at least one of the output devices.

2. Methods of claim 1 where determining spatial manipulations and properties is particularly determining maximal intersections, and said ordering step to sort pairwise intersections is further defined as:

```
Function order(P,T)
    for all p ∈ P do label (p) ← {}
    j ← |P|
    repeat
        p ← pair ∈ P with the
                    lexicographically highest label
        σ(j) ← p
        P ← P - p
        for all x in P do
            begin
                if three-adj (x,p,T) then
                    label (x) ← label (x) ∪ (j)
                j ← j - 1
            end
    until P is empty
    return σ
end
Function three-adj (x,y,T)
    bits ← x ∪ y
    when every subset {X_1,X_2,X_3 ⊂ bits} ∈ T then
        return true else return false
end
Function lex-greater(11 12)
    while (first(11) = first(12)) and
              (11 ≠ {}) and (12 ≠ {}) do
        begin
            11 ← rest(11)
            12 ← rest(12)
        end
    if 11 ≠ {} then
        if 12 ≠ {} then
            if (first(11) > first(12)) then return(true)
                else return(false)
        else
            return (true)
    else
        return(false),
``` and said reverse elimination step to eliminate pairwise intersections is further defined as:

```
Function eliminate(P,T,σ)
    C ← {}
```

```
        For j ← 1 to σ do
            begin
                p ← σ(j)
                c ← {r | (∃ x ε P) three-adj (x,p,T) ^ (r ε x)}
                if there does not exist d ε C such that d ⊇ c
                    C ← C + c
                T ← T - {t|t ⊃ p }
            end
        return C.
```

3. Methods of claim 1 where 'determining spatial manipulations and properties' is more particularly determining maximal intersection information related to uses of terrain regions in accordance with physical attributes of a set of regions.

4. Methods of claim 1 where 'determining spatial manipulations and properties' is more particularly determining maximal intersection information related to radio transmitter frequency allocation in accordance with physical attributes of transmitters as they may relate to a set of regions.

5. Methods of claim 1 where "determining spatial manipulations and properties" is particularly determining minimal intersections, and step c) is further comprised:

iii) determine possible minimal intersection candidates in a 'generate candidates' step;
   iv) determine set of regions which overlaps each candidate;
   v) determine number of components in the overlap;
   vi) determine difference in rank between first and zeroth homology groups;
   vii) determine minimal intersections.

6. Methods of claim 5 wherein:

step i) is further defined by:

```
Function order2 (P,T)
j ← |P|
for all p ε P do
    begin
        p-label (p) ← { }
        s-label (p) ← { }
    end
repeat
    p ← pair in P with the lexicographically
        highest p-label, where ties are broken in
        favor of the highest s-label
    P ← P - p
    σ(j) ← p
    for all x in P do
        begin
            if three-adj (x,p,T) then
                begin
                    p-label (x) ← p-label (x) · ∪ {j}
                    U ← all regions involved in x or p
                    N ← { }
                    for all pairs u,v ε U do
                        begin
                            if σ^{-1} ((u,v)) < j then N ← N ∪ σ^{1} ((u,v))
                        end
                    if |N| + 2 = |U| · (|U|-1)/2 then
                        begin
                            for all n σ N do
                                begin
                                    s-label (x) ← s-label (x) ∪ n
                                end
                        end
                end
        end
    j ← j - 1
until P is empty
return σ
end
``` and step iii) is further defined by:

```
function min-candidates (M)
cands ← { }
M1 ← M
while M1 ≠ { } do
    begin
        M2 ← rest (M1)
        while M2 ≠ { } do
            begin
                M3 ← rest (M2)
                while M3 ≠ { } do
                    begin
                        c ← first (M1) ∩ first (M2) ∩ first (M3)
                        if not member(c,cands) then
                            cands ← cands ∪ c
                    end
            end
    end
return cands
``` step iv) is further defined by:

```
function overlap (X,M)
Y ← { }
For all m ε M do
    if X ⊂ m then Y ← Y ∪ m - X
return Y
``` step v) is further defined by:

```
function components (X,Y,M)
parts ← { }
firstpart ← { }
while Y ≠ { } do
    begin
        repeat
            new ← { }
            for all y ε Y do
                begin
                    if ∃ p ε firstpart such that
                        intersects ? (X ∪ {y,p},M) then
                        begin
                            new ← new ∪ y
                            Y ← Y - y
                        end
                end
            firstpart ← firstpart ∪ new
        until new ← { }
        parts ← parts ∪ firstpart
        firstpart ← { }
    end
return length (parts)
``` step vi) is further defined by:

```
function iterative-euler (X,Y,M,σ)
x ← an arbitrary region in X
sort y ε Y according to σ^{-1} of edges y-x
sum ← 1
while Y ≠ { } do
    begin
        f ← first (Y)
        Y ← rest (Y)
        sum ← sum + components (X ∪ {f},Y,M) - 1
    end
return sum
``` step vii) is further defined by:

```
function minimal-intersections(M,σ)
CANDS ← min-candidates (M) ∪ {}
m ← {}
For all c ∈ CANDS do
        begin
            o ← overlap(c,M)
            p ← components(c,o)
            e ← iterative-euler(c,o,σ)
            if e + p − 1 > 0 then m ← m ∪ c
        end
return m.
```

7. Methods of claim 5 where 'determining spatial manipulations and properties' is more particularly determining minimal intersection information related to radio transmitter frequency allocation in accordance with physical attributes of transmitters as they may relate to a set of regions.

8. Methods of claim 5 where 'determining spatial manipulations and properties' is more particularly determining minimal intersection information related to uses of terrain regions in accordance with physical attributes of a set of regions.

9. Methods of claim 5 where 'determining spatial manipulations and properties' is more particularly determining minimal paths, and step c) is comprised the steps:

vii) determine region sets in a minimal skeleton, viii) determine adjacencies between sets in the minimal skeleton, ix) map beginning and endpoint to sets in the minimal skeleton, x) search graph defined by sets and adjacencies to determine cycle-free paths between beginning and end sets.

10. Methods of claim 9, wherein:

step i) is further defined by:

```
Function order2(P,T)
j ← |P|
for all p ∈ P do
    begin
        p-label (p) ← {}
        s-label (p) ← {}
    end
repeat
    p ← pair in P with the lexicographically
        highest p-label, where ties are broken in
        favor of the highest s-label.
    P ← P − p
    σ(j) ← p
    for all x in P do
        begin
            if three-adj (x,p,T) then
                begin
                    p-label (x) ← p-label (x) ∪ {j}
                    U ← all regions involved in x or p
                    N ← {}
                    for all pairs u,v ∈ U do
                        begin
                            if σ^{(−1)} ({u,v}) ≤ j then N ← N ∪ σ^{(1)}({u,v})
                        end
                    if |N| + 2 = |U| · (|U|−1)/2 then
                        begin
                            for all n ∈ N do
                                begin
                                    s-label (x) ← s-label (x) ∪ n
                                end
                        end
                end
        end
    j ← j − 1
```

```
until P is empty
return σ
end
``` and step iii) is further defined by:

```
function min-candidates2 (M)
cands ← {}
M1 ← M
while M1 ≠ {} do
    begin
        M2 ← rest (M1)
        while M2 ≠ {} do
            begin
                c2 ← first (M1) ∩ first (M2)
                if not member (c2,cands) then
                    cands ← cands ∪ c2
                M3 ← rest (M2)
                while M3 ≠ {} do
                    begin
                        c3 ← c2 ∩ first (M3)
                        if not member (c3,cands) then
                            cands ← cands ∪ c3
                    end
            end
    end
return cands
``` and step vii) is further defined by:

```
function path-places (C,M,σ)
places ← {}
for all c ∈ C do
    begin
        σ ← overlap (c,M)
        comp ← components (c,o,M)
        euler ← euler(c,o,M,σ)
        f (comp ≠ 1) or (euler + comp − 1 ≠ 0) then
            places ← places ∪ c
    end
return places;
``` and step viii) is further defined by:

```
function skeleton-edges (P)
edges ← {}
for all p1 ∈ P do
    if p1 ∉ m then
        for all p2 ∈ P do
            if p1 ⊃ p2 and ¬∃ p3 ∈ P (p1 ⊃ p3 ⊃ p2) then
                edges ← edges ∪ (p1,p2)
return edges.
```

11. Methods of claim 9 where 'determining spatial manipulations and properties' is more particularly determining minimal skeleton information related to uses of terrain regions in accordance with physical attributes of a set of regions.

12. Methods of claim 9 where 'determining spatial manipulations and properties' is more particularly determining minimal skeleton information related to uses for determining a preferred assembly sequence.

13. Apparatus for topological inference decision making, the system comprising:
  (a) at least one input device for receiving data comprising a hypergraph, the data being related to a set of physical elements, each element being multi-dimensional wherein,
    i) said elements having properties including at least: a closed path periphery, an interior portion, and an exterior portion, ii) any two or more elements having additional properties, said properties including: a simply connected pairwise intersection, a triple intersection, three-adjacent edges, element intersections, and element unions, iii) the set further having properties, said properties including: a closed path periphery, element intersections, element unions;

(b) a computer storage system, coupled to at least one of the input devices, for storing data input into the system through at least one of the input devices;

(c) a programmable processor, coupled to the computer storage system and at least one of the input devices, for processing the input data stored in the data storage system to generate output data, in accordance with programming implementing the functions of:

i) an ordering step to sort pairwise intersections, ii) a reverse elimination step which eliminates pairwise intersections in that order and finds all maximal simultaneous intersections, and (d) applying the output data to at least one output device.

14. Apparatus of claim 13 where 'topological inference decision making' is more particularly finding maximal intersections, and said ordering step to sort pairwise intersections is further defined as:

```
Function order (P,T)
for all p ∈ P do label (p) ← { }
j ← |P|
repeat
            p ← pair ∈ P with the
                         lexicographically highest label
            σ(j) ← p
            P ← P - p
            for all x in P do
                begin
                if three-adj (x,p,T) then
                        label (x) ← label (x) ∪ (j)
                end
            j ← j - 1
until P ia empty
return σ
end
Function three-adj (x,y,T)
bits ← x ∪ y
when every subset {X₁X₂X₃ ⊂ bits} ∈ T then
        return true else return false
end
Function lex-greater (l1 l2)
while (first (l1) = first(l2)) and
                (l1 ≠ { }) and (l2 ≠ { }) do
        begin
        l1 ← rest (l1)
        l2 ← rest (l2)
        end
if l1 ≠ { } then
        if l2 ≠ { } then
                if (first (l1) > first (l2) then return (true)
                                else return (false)
        else
                        return (true)
else
return (false),
``` and said reverse elimination step to eliminate pairwise intersections is further defined as:

```
Function eliminate (P,T,σ)
C ← { }
For j ← 1 to σ do
        begin
        p ← σ(j)
        c ← {r | (∃ x ∈ P) three-adj (x,p,T) · (r ∈ x)}
        if there does not exist d ∈ C such that d ⊃ c
                C ← C + c
        T ← T - {t|t ⊃ p}
        end
return C.
```

15. Apparatus of claim 13 where 'topological inference decision making' is more particularly finding maximal intersection information related to uses of terrain regions in accordance with physical attributes of a set of regions.

16. Apparatus of claim 13 where 'topological inference decision making' is more particularly finding maximal intersection information related radio transmitter frequency allocation in accordance with physical attributes of transmitters as they may relate to a set of regions.

17. Apparatus of claim 13 where "topological inference decision making" is particularly determining minimal intersections, and element c) is further comprised:

iii) determine possible minimal intersection candidates in a 'generate candidates' step;

iv) determine set of regions which overlaps each candidate;

v) determine number of components in the overlap;

vi) determine difference in rank between first and zeroth homology groups;

vii) determine minimal intersections.

18. Apparatus of claim 17 wherein:

step i) is further defined by:

```
Function order2 (P,T)
j ← |P|
for all p ∈ P do
        begin
                p-label (p) ← { }
                s-label (p) ← { }
        end
repeat
        p ← pair in P with the lexicographically
                        highest p-label, where ties are broken in
                        favor of the highest s-label.
        P ← P - p
        σ(j) ← p
        for all x in P do
                begin
                if three-adj (x,p,T) then
                        begin
                                p-label (x) ← p-label (x) ∪ {j}
                                U ← all regions involved in X or p
                                N ← { }
                                for all pairs u,v ∈ U do
                                        begin
                                        if σ⁽⁻¹⁾ ((u,v)) < j then N ← N ∪ σ⁽¹⁾ ((u,v))
                                        end
                                if |N| + 2 = |U| · (|U|-1)/2 then
                                        begin
                                        for all n ∈ N do
                                                begin
                                                s-label (x) ← s-label (x) ∪ n
                                                end
                                        end
                                end
end
```

-continued

```
until P is empty
return σ
end:
``` and step iii) is further defined by:

```
function min-candidates (M)
cands ← {}
M1 ← M
while M1 ≠ {} do
        begin
        M2 ← rest (M1)
        while M2 ≠ {} do
                begin
                M3 ← rest(M2)
                while M3 ≠ {} do
                        begin
                        c ← first(M1) ∩ first (M2) ∩ first(M3)
                        if not member(c,cands) then
                                    cands ← cands ∪ C
                        end
                end
        end
return cands
``` step iv) is further defined by:

```
function overlap (X,M)
Y ← {}
For all m ∈ M do
    if X ⊂ m then Y ← Y ∪ m - X
return Y
``` step v) is further defined by:

```
function components (X,Y,M)
parts ← {}
firstpart ← {}
while Y ≠ {} do
    begin
    repeat
            new ← {}
            for all y ∈ Y do
                    begin
                    if ∃ p ∈ firstpart such that
                            intersects? (X ∪ {y,p},M) then
                            begin
                            new ← new ∪ y
                            Y ← Y - y
                            end
                    end
            firstpart ← firstpart ∪ new
            until new = {}
    parts ← parts ∪ firstpart
    firstpart ← {}
    end
return length (parts)
``` step vi) is further defined by:

```
function iterative-euler (X,Y,M,σ)
x ← an arbitrary region in X
sort y ∈ Y according to σ^(-1) of edges y-x
sum ← 1
while Y ≠ {} do
        begin
        f ← first(Y)
        Y ← rest(Y)
        sum ← sum + components(X ∪ (f),Y,M) - 1
```

```
        end
return sum
``` step vii) is further defined by:

```
function minimal-intersections (M,σ)
CANDS ← min-candidates(M) ∪ {}
m ← {}
For all c ∈ CANDS do
        begin
        o ← overlap(c,M)
        p ← components(c,o)
        e ← iterative-euler(c,o,σ)
        if e + p - 1 > 0 then m ← m ∪ c
        end
return m.
```

19. Apparatus of claim 17 where "topological inference decision making" is more particularly determining minimal intersection information related to radio transmitter frequency allocation in accordance with physical attributes of transmitters as they may relate to a set of regions.

20. Apparatus of claim 17 where "topological inference decision making" is more particularly determining maximal intersection information related to uses of terrain regions in accordance with physical attributes of a set of regions.

21. Apparatus of claim 17 where "topological inference decision making" is more particularly determining minimal paths, and element c) is further comprised the steps:

vii) determine region sets in a minimal skeleton, viii) determine adjacencies between sets in the minimal skeleton, ix) map beginning and endpoint to sets in the minimal skeleton, x) search graph defined by sets and adjacencies to determine cycle-free paths between beginning and end sets.

22. Apparatus of claim 21, wherein step i) is further defined by:

```
Function order2 (P,T)
j ← |P|
for all p ∈ P do
        begin
        p-label(p) ← {}
        s-label(p) ← {}
        end
repeat
        p ← pair in P with the lexicographically
                highest p-label, where ties are broken in
                favor of the highest s-label.
        P ← P - p
        σ(j) ← p
        for all x in P do
                begin
                if three-adj (x,p,T) then
                        begin
                        p-label (x) ← p-label (x) ∪ {j}
                        U ← all regions involved in x or p
                        N ← {}
                        for all pairs u,v ∈ U do
                                begin
                                if σ^(-1)((u,v)) ≤ j then N ← N ∪ σ^(1)((u,v))
                                end
                        if |N| + 2 = (|U| · (|U|-1)/2 then
                                begin
                                for all n σ N do
                                        begin
                                        s-label (x) ← s-label (x) ∪ n
```

```
            end
            end
        end
    end
    j ← j - 1
until P is empty
return σ
end;
``` and step iii) is further defined by:

```
function min-candidates2 (M)
    cands ← { }
    M1 ← M
    while M1 ≠ { } do
        begin
        M2 ← rest (M1)
        while M2 ≠ { } do
            begin
            c2 ← first(Mi) ∩ first(M2)
            if not member(c2,cands) then
                cands ← cands ∪ c2
            M3 ← rest(M2)
            while M3 ≠ { } do
                begin
                c3 ← c2 ∩ first (M3)
                if not member(c3,cands) then
                    cands ← cands ∪ c3
                end
            end
        end
    return cands;
``` and step vii) is further defined by:

```
function path-places (C,M,σ)
    places ← { }
    for all c ∈ C do
        begin
        o ← overlap(c,M)
        comp ← components(c,o,M)
        euler ← euler(c,o,M,σ)
        f (comp ≠ 1) or (euler + comp - 1 ≠ 0) then
            places ← places ∪ c
        end
    return places;
``` and step viii) is further defined by:

```
function skeleton-edges (P)
    edges ← { }
    for all p1 ∈ P do
        if p1 ∉ m then
            for all p2 ∈ P do
                if p1 ⊃ p2 and ¬∃ p3 ∈ P (p1 ⊃ p3 ⊃ p2) then
                    edges ← edges ∪ (p1,p2)
    return edges.
```

23. Apparatus of claim 21 where "topological inference decision making" is more particularly determining minimal skeleton information related to uses of terrain regions in accordance with physical attributes of a set of regions.

24. Apparatus of claim 21 where "topological inference decision making" is more particularly determining minimal skeleton information related to uses for determining a preferred assembly sequence.

25. An article of manufacture comprising:

A computer usable medium having computer readable program code means embodied therein for causing topological inference decision making, the computer readable program code means in said article of manufacture comprising:

a) computer readable program code means for causing the computer to receive data related to a set of physical elements, each element being multidimensional wherein,
   i) said elements having properties including at least: a closed path periphery, an interior portion, and an exterior portion,
   ii) any two or more elements having additional properties, said properties including: a simply connected pairwise intersection, a triple intersection, three-adjacent edges, element intersections, and element unions,
   iii) the set further having properties, said properties including: a closed path periphery, element intersections, element unions;

b) computer readable program code means for causing the computer to effect
   i) an ordering step to sort pairwise intersections,
   ii) a reverse elimination step which eliminates pairwise intersections in that order and finds all maximal simultaneous intersections, and c) computer readable program code means for causing the computer to output a file having a plurality of locations containing information relating to computed topological spatial elements.

26. Articles of claim 25 where "topological inference decision making" is more particularly causing determination of maximal intersections, and said ordering step to sort pairwise intersections is further defined as:

```
Function order (P,T)
for all p ∈ P do label(p) ← { }
j ← |P|
repeat
            p ← pair ∈ P with the
                        lexicographically highest label
            σ(j) ← p
            P ← P - p
            for all x in P do
                        begin
                        if three-adj (x,p,T) then
                                label (x) ← label (x) ∪ {j}
                        end
    j ← j - 1
until P is empty
return σ
end
Function three-adj (x,y,T)
bits ← x ∪ y
when every subset (X₁X₂X₃ ⊂ bits} ∈ T then
            return true else return false
end
Function lex-greater(l1 l2)
while (first(l1) = first(l2)) and
                    (l1 ≠ { }) and (l2 ≠ { }) do
            begin
            l1 ← rest(l1)
            l2 ← rest(l2)
            end
    if l1 ≠ { } then
            if l2 ≠ { } then
                        if (first(l1) > first(l2)) then return(true)
                                    else return(false)
            else
                        return(true)
    else
                        return (false),
``` and said reverse elimination step to eliminate pairwise intersections is further defined as:

```
Function eliminate (P,T,σ)
C ← {}
For j ← 1 to σ do
    begin
        p ← σ(j)
        c ← {r |(∃ x ∈ P) three-adj (x,p,T) ∧ (r ∈ x)}
        if there does not exist d ∈ C such that d ⊇ c
            C ← C + c
        T ← T - {t|t ⊃ p}
    end
return C.
```

27. Articles of claim 25 where "topological inference decision making" is more particularly causing determination of maximal intersections, and maximal intersections information is particularly related to uses of terrain regions in accordance with physical attributes of a set of regions.

28. Articles of claim 25 where "topological inference decision making" is more particularly causing determination of maximal intersections, and maximal intersections information is particularly related to radio transmitter frequency allocation in accordance with physical attributes of transmitters as they may relate to a set of regions.

29. Articles of claim 25 where "topological inference decision making" is more particularly causing determination of minimal intersections, and step b) is further comprised:
   iii) determine possible minimal intersection candidates in a 'generate candidates' step;
   iv) determine set of regions which overlaps each candidate;
   v) determine number of components in the overlap;
   vi) determine difference in rank between first and zeroth homology groups;
   vii) determine minimal intersections.

30. Articles of claim 29 wherein:
step i) is further defined by:

```
Function order2 (P,T)
j ← |P|
for all p ∈ P do
    begin
        p-label(p) ← {}
        s-label(p) ← {}
    end
repeat
    p ← pair in P with the lexicographically
            highest p-label, where ties are broken in
            favor of the highest s-label.
    P ← P - p
    σ(j) ← p
    for all x in P do
        begin
            if three-adj (x,p,T) then
                begin
                    p-label (x) ← p-label (x) ∪ {j}
                    U ← all regions involved in x or p
                    N ← {}
                    for all pairs u,v ∈ U do
                        begin
                            if σ{-1} ((u,v)) < j then N ← N ∪ σ{1}((u,v))
                        end
                    if |N|+ 2 = |U| · (|U|-1)/2 then
                        begin
                            for all n σ N do
                                begin
                                    s-label (x) ← s-label (x) ∪ n
                                end
                        end
                end
        end
    j ← j - 1
``` until P is empty
return σ
end;

and step iii) is further defined by:

```
function min-candidates (M)
cands ← {}
M1 ← M
while M1 ≠ {} do
    begin
        M2 ← rest(M1)
        while M2 ≠ {} do
            begin
                M3 ← rest(M2)
                while M3 ≠ {} do
                    begin
                        c ← first(M1) ∩ first(M2) ∩ first(M3)
                        if not member(c,cands) then
                                cands ← cands ∪ c
                    end
            end
    end
return cands
``` step v) is further defined by:

```
function components (X,Y,M)
parts ← {}
firstpart ← {}
while Y ≠ {} do
    begin
        repeat
            new ← {}
            for all y ∈ Y do
                begin
                    if ∃ p ∈ firstpart such that
                            intersects? (X ∪ {y,p},M) then
                        begin
                            new ← new ∪ y
                            Y ← Y - y
                        end
                end
            firstpart ← firstpart ∪ new
        until new = {}
        parts ← parts ∪ firstpart
        firstpart ← {}
    end
return length(parts)
``` step vi) is further defined by:

```
function iterative-euler (X,Y,M,σ)
x ← an arbitrary region in X
sort y ∈ Y according to σ{-1} of edges y-x
sum ← 1
while Y ≠ {} do
    begin
        f ← first(Y)
        Y ← rest(Y)
        sum ← sum + components(X ∪ {f},Y,M) - 1
    end
return sum
``` step vii) is further defined by:

```
function minimal-intersections(M,σ)
CANDS ← min-candidates(M) ∪ {}
m ← {}
```

```
For all c ∈ CANDS do
    begin
        o ← overlap(c,M)
        p ← components(c,o)
        e ← iterative-euler(c,o,σ)
        if e + p - 1 > 0 then m ← m ∪ c
    end
return m.
```

31. Articles of claim 29 where "topological inference decision making" is more particularly causing determination of minimal intersection information related radio transmitter frequency allocation in accordance with physical attributes of transmitters as they may relate to a set of regions.

32. Articles of claim 29 where "topological inference decision making" is more particularly causing determination of minimal intersection information related to uses of terrain regions in accordance with physical attributes of a set of regions.

33. Articles of claim 29 "topological inference decision making" is more particularly causing determination of minimal paths, and step b) is further comprised the steps:

vii) determine region sets in a minimal skeleton, viii) determine adjacencies between sets in the minimal skeleton, ix) map beginning and endpoint to sets in the minimal skeleton, x) search graph defined by sets and adjacencies to determine cycle-free paths between beginning and end sets.

34. Articles of claim 33, wherein step i) is further defined by:

```
Function order2 (P,T)
j ← |P|
for all p ∈ P do
    begin
        p-label (p) ← {}
        s-label (p) ← {}
    end
repeat
    p ← pair in P with the lexicographically
        highest p-label, where ties are broken in
        favor of the highest s-label.
    P ← P - p
    σ(j) ← p
    for all x in P do
        begin
            if three-adj (x,p,T) then
                begin
                    p-label (x) ← p-label (x) ∪ {j}
                    U ← all regions involved in x or p
                    N ← {}
                    for all pairs u,v ∈ U do
                        begin
                            if σ{-1} ((u,v)) < j then N ← N ∪ σ{1} ((u,v))
                        end
                    if |N| + 2 = |U| · (|U|-1)/2 then
                        begin
                            for all n σ N do
                                begin
                                    s-label(x) ← s-label (x) ∪ n
                                end
                        end
                end
        end
    j ← j - 1
```

```
until P is empty
return σ
end
``` and step iii) is further defined by:

```
function min-candidates2 (M)
cands ← {}
M1 ← M
while M1 ≠ {} do
    begin
        M2 ← rest(M1)
        while M2 ≠ {} do
            begin
                c2 ← first (M1) ∩ first (M2)
                if not member (c2,cands) then
                    cands ← cands ∪ c2
                M3 ← rest(M2)
                while M3 ≠ {} do
                    begin
                        c3 ← c2 ∩ first(M3)
                        if not member(c3,cands) then
                            cands ← cands ∪ c3
                    end
            end
    end
return cands;
``` and step vii) is further defined by:

```
function path-places (C,M,σ)
places ← {}
for all c ∈ C do
    begin
        σ ← overlap (c,M)
        comp ← components (c,o,M)
        euler ← euler (c,o,M,σ)
        f (comp ≠ 1) or (euler + comp - 1 ≠ 0) then
            places ← places ∪ c
    end
return places;
``` and step viii) is further defined by:

```
function skeleton-edges (P)
edges ← {}
for all p1 ∈ P do
    if p1 ∉ m then
        for all p2 ∈ P do
            if p1 ⊃ p2 and ¬∃ p3 ∈ P (p1 ⊃ p3 ⊃ p2) then
                edges ← edges ∪ (p1,p2)
return edges.
```

35. Articles of claim 29 where "topological inference decision making" is more particularly causing determination of minimal skeleton information related to uses of terrain regions in accordance with physical attributes of a set of regions.

36. Articles of claim 29 where "topological inference decision making" is more particularly causing determination of minimal skeleton information related to uses for determining a preferred assembly sequence.

* * * * *